(12) United States Patent
Huang et al.

(10) Patent No.: US 11,588,398 B1
(45) Date of Patent: Feb. 21, 2023

(54) RESONANT CONVERTER AND CONTROLLING METHOD THEREOF

(71) Applicant: DELTA ELECTRONICS (SHANGHAI) CO., LTD., Shanghai (CN)

(72) Inventors: Hui Huang, Shanghai (CN); Laszlo Huber, Shanghai (CN); Kun-Peng Wang, Shanghai (CN); Shuai-Lin Du, Shanghai (CN); Kai Dong, Shanghai (CN); Peter Mantovanelli Barbosa, Shanghai (CN); Jin-Fa Zhang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/538,421

(22) Filed: Nov. 30, 2021

(30) Foreign Application Priority Data

Sep. 8, 2021 (CN) .......................... 202111048548.X

(51) Int. Cl.
*H02M 3/00* (2006.01)
*H02M 3/335* (2006.01)

(52) U.S. Cl.
CPC .......... *H02M 3/01* (2021.05); *H02M 3/33571* (2021.05); *H02M 3/33573* (2021.05); *H02M 3/33592* (2013.01)

(58) Field of Classification Search
CPC ............... H02M 3/01; H02M 3/33571; H02M 3/33573; H02M 3/33592
See application file for complete search history.

(56) References Cited

U.S. PATENT DOCUMENTS

| | | | |
|---|---|---|---|
| 6,504,497 B2 | 1/2003 | Jang et al. | |
| 7,061,212 B2 | 6/2006 | Phadke | |
| 7,729,143 B2 | 6/2010 | Lin et al. | |
| 8,736,240 B2 | 5/2014 | Liu et al. | |
| 9,490,704 B2 | 11/2016 | Jang et al. | |
| 9,812,977 B2 | 11/2017 | Ye et al. | |
| 2012/0014138 A1* | 1/2012 | Ngo .................. | H02M 3/33584 363/17 |
| 2020/0186046 A1* | 6/2020 | Tanaka ..................... | H02M 1/32 |
| 2021/0367521 A1* | 11/2021 | Sakai ................ | H02M 3/33584 |

* cited by examiner

*Primary Examiner* — Jue Zhang
(74) *Attorney, Agent, or Firm* — Hauptman Ham, LLP

(57) ABSTRACT

A resonant converter includes a transformer, a resonant network, control circuit, primary and secondary circuits. One of the primary switches is turned on from a first switching moment until a second switching moment. The resonant network is coupled between the primary circuit and the primary winding. A current of the resonant network changes a direction at a first moment between the first and second switching moments. The secondary circuit is coupled to the secondary winding. One of the secondary switches is turned on during first and second preset time interval to increase the current in a direction by the secondary winding being clamped by a preset voltage, in which the output current is increased in an opposite direction or equal to zero.

28 Claims, 7 Drawing Sheets

RESONANT CONVERTER AND CONTROLLING METHOD THEREOF

CROSS-REFERENCE TO RELATED APPLICATION

This application claims priority to China Application Serial Number 202111048548.X, filed Sep. 8, 2021, which is herein incorporated by reference in its entirety.

BACKGROUND

Technical Field

The present disclosure relates to a converter. More particularly, the present disclosure relates to a resonant converter and a controlling method thereof.

Description of Related Art

A conventional resonant converter operates with variable switching-frequency control. The resonant converter operating below the resonant frequency can achieve zero voltage switching (ZVS) in the primary switches, and zero current switching (ZCS) in secondary switches. The resonant converter is widely used in applications where high efficiency, high frequency and high power density are required. Especially for high end server, network switch, storage device, telecom base station, data center, etc. inductor-inductor-capacitor (LLC) resonant converter is widely applied in power conversion.

The network power supply generally needs to meet holdup time and power line disturbance (PLD) requirements. The holdup time means that when an input power fails, an output voltage of the LLC resonant converter needs to hold for a period of time, such as from 10 ms to 20 ms, for system backup operation. PLD means when an input power is lost for a period of time, such as 10 ms, then input power is restored. During this period of time, the output voltage of the LLC resonant converter needs to be maintained in a specified voltage range, and the system operation isn't interrupted.

The network power supply includes a PFC and the LLC resonant converter, wherein an input side of the LLC resonant converter connects to an output side of the PFC. When input power is off, a bulk voltage of the PFC will decrease, and the output voltage of the LLC resonant converter cannot be maintained in the specified voltage range when the bulk voltage of PFC decrease to a certain threshold.

At present, more and more researches concentrate on increasing holdup time of the power supply. One solution is to increase capacity of bulk capacitor. It can increase holdup time, but it increases the cost and required more space in the power supply. Another technical solution is to add a boost circuit between the PFC and the LLC resonant converter. It can increase holdup time, but also increase the cost and design complexity of the power supply.

Above-mentioned technical solutions have disadvantages such as higher cost and lower power density.

SUMMARY

The present disclosure includes a resonant converter including a primary circuit, a transformer, a resonant network, a secondary circuit and control circuit. The primary circuit configured to receive an input voltage. The primary circuit includes a plurality of primary switches configured to operate with a switching frequency. At least one of the primary switches is configured to be turned on from a first switching moment until a second switching moment. The transformer having a primary winding and a secondary winding. The resonant network is coupled between the primary circuit and the primary winding. A current of the resonant network changes a direction at a first moment between the first switching moment and the second switching moment. The secondary circuit is coupled to the secondary winding and configured to provide an output voltage to a load. The secondary circuit includes a plurality of secondary switches. At least first one of the secondary switches is configured to be turned on during a first preset time interval which is from the first moment to a second moment to increase the current of the resonant network in a first direction by the secondary winding being clamped by an preset voltage, wherein an output current of the resonant converter is increased in a second direction or equal to zero during the first preset time interval. At least second one of the secondary switches is configured to be turned on during a second preset time interval which is from a third moment to the second switching moment to increase the current of the resonant network in the first direction by the secondary winding being clamped by the preset voltage, wherein the output current of the resonant converter is increased in the second direction or equal to zero during the second preset time interval. The third moment is between the second moment and the second switching moment. The control circuit is coupled with the primary switches and the secondary switches, configured to control at least one of the primary switches to be turned on from a first switching moment until a second switching moment, and configured to control the at least first one of the secondary switches to be turned on during the first preset time interval and the at least second one of the secondary switches to be turned on during the second preset time interval.

The present disclosure includes a method of controlling a resonant converter. The resonant converter includes a primary circuit, a resonant network coupled to the primary circuit, a transformer having a primary winding coupled to the resonant network and a secondary winding, a secondary circuit coupled to the secondary winding and a control circuit coupled to the primary circuit and the secondary circuit. The primary circuit includes primary switches, and the secondary winding includes secondary switches. The method includes: controlling, with a switching frequency, the primary switches of the primary circuit configured to receive an input voltage; transforming the input voltage by the transformer and the resonant network; controlling the secondary switches of the secondary circuit to provide an output voltage to a load. Controlling the primary switches includes: turning on at least one of the primary switches from a first switching moment until a second switching moment. Controlling the secondary switches includes: turning on at least first one of the secondary switches during a first preset time interval which is from a first moment to a second moment to increase the current of the resonant network in a first direction by the secondary winding being clamped by the preset voltage, in which an output current of the resonant converter is increased in a second direction or equal to zero during the second preset time interval, in which the first moment and the second moment are between the first switching moment and the second switching moment, and the current of the resonant network changes a direction at the first moment; turning on at least second one of the secondary switches during a second preset time interval which is from a third moment to the second switching moment to increase the current of the resonant network in the first direction by the secondary winding being clamped by the preset voltage, in which the output current of the resonant converter is increased in the second direction or equal to zero during the second preset time interval, in which the third moment is between the second moment and the second switching moment.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
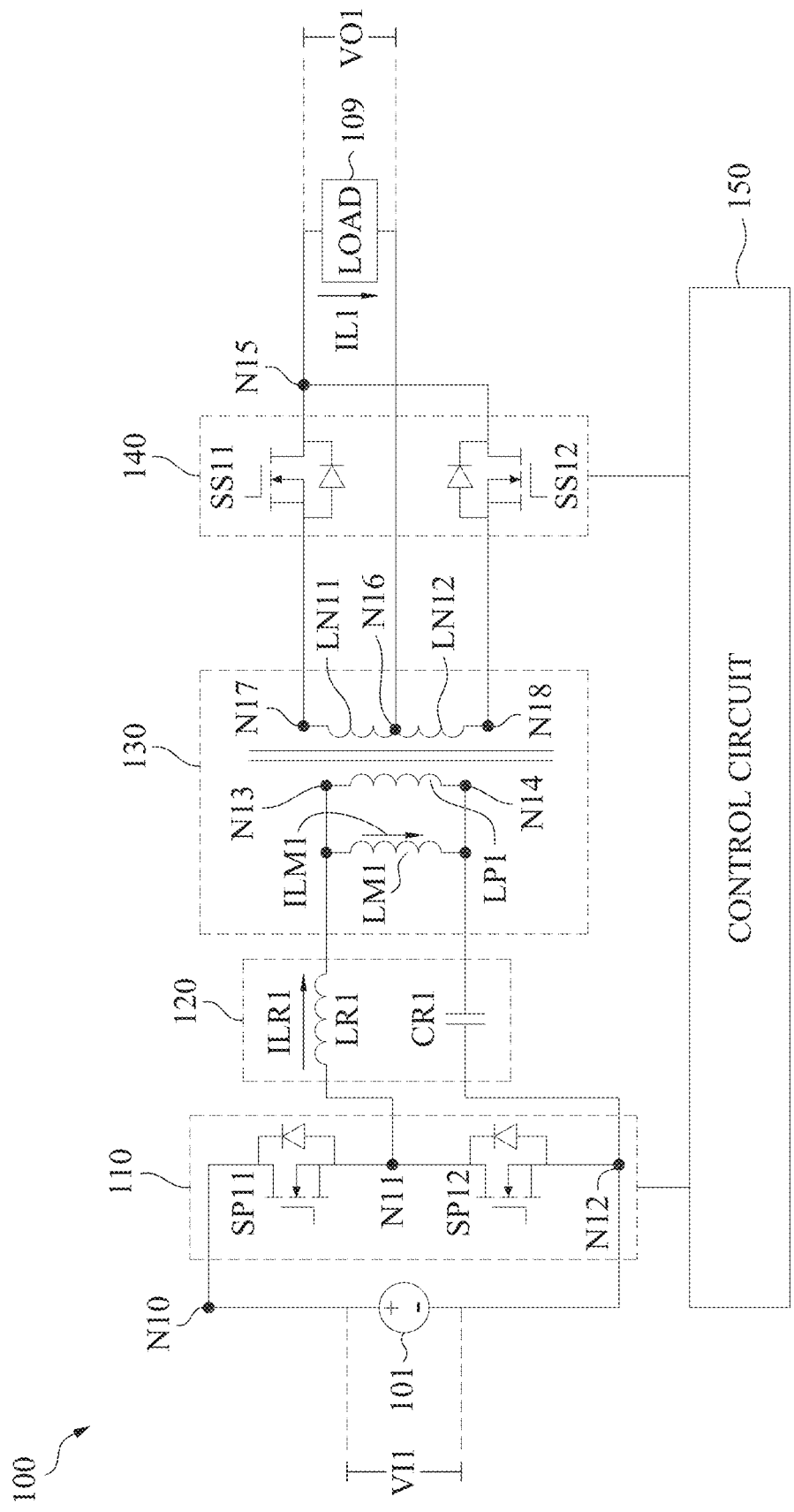
FIG. 1 is a circuit diagram of a resonant converter in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms applied throughout the following descriptions and claims generally have their ordinary meanings clearly established in the art or in the specific context where each term is used. Those of ordinary skill in the art will appreciate that a component or process may be referred to by different names. Numerous different embodiments detailed in this specification are illustrative only, and in no way limits the scope and spirit of the disclosure or of any exemplified term.

It is worth noting that the terms such as "first" and "second" used herein to describe various elements or processes aim to distinguish one element or process from another. However, the elements, processes and the sequences thereof should not be limited by these terms. For example, a first element could be termed as a second element, and a second element could be similarly termed as a first element without departing from the scope of the present disclosure.

In the following discussion and in the claims, the terms "comprising," "including," "containing," "having," "involving," and the like are to be understood to be open-ended, that is, to be construed as including but not limited to. As used herein, instead of being mutually exclusive, the term "and/or" includes any of the associated listed items and all combinations of one or more of the associated listed items.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a circuit diagram of a resonant converter 100 in accordance with some embodiments of the present disclosure. As illustratively shown in FIG. 1, the resonant converter 100 is configured to receive an input voltage VI1 from an input power supply 101 and provide an output voltage VO1 to a load 109, wherein the input voltage VI1 can be replaced by an input current or an input power, the output voltage VO1 is can be replaced by an output current, or an output power. The resonant converter 100 includes a primary circuit 110, a resonant network 120, a transformer 130, a secondary circuit 140 and a control circuit 150.

In some embodiments, the primary circuit 110 is coupled to an input power supply 101 to receive an input voltage VI1. The transformer 130 has a primary winding and secondary winding. The resonant network 120 is coupled between the primary circuit 110 and the primary winding, wherein the resonant network can be implemented as an LLC (inductance-inductance-capacitor) resonant network, an LC resonant network or an LCC resonant network. The secondary circuit 140 is coupled between the secondary winding and a load 109. In some embodiments, the primary circuit 110 is configured to receive the electric energy from the input power supply 101 and transmit electric energy to the resonant network 120. In some embodiments, the input power supply 101 is a bulk capacitor or an independent DC power supply or a DC output of other circuit. The resonant network 120 is configured to store the electric energy and transmit the electric energy to the transformer 130. The transformer 130 is configured to transmit the electric energy to the secondary circuit 140 and the secondary circuit 140 is configured to receive the electric energy and provide the electric energy to the load 109. The transformer 130 may be configured to transmit the electric energy from the secondary circuit 140 to the resonant network 120 and/or the input power supply 101. The control circuit 150 is configured to control the primary circuit 110 and the secondary circuit 140.

As illustratively shown in FIG. 1, the primary circuit 110 is implemented by a half bridge circuit including switches SP11 and SP12. The switches SP11, SP12 are coupled in series. The switch SP11 is coupled to the input power supply 101 at a node N10. The switch SP12 is coupled to the input power supply 101 at a node N12. In some embodiments, the switches SP11 and SP12 are configured to operate with a switching frequency determined by the control circuit 150. In some other embodiments, the primary circuit 110 is implemented by a full bridge circuit as a primary circuit 310 illustratively shown in FIG. 3.

As illustratively shown in FIG. 1, the resonant network 120 is implemented by LLC resonant network including an inductor LR1, an excited inductance LM1 and a capacitor CR1. The excited inductance LM1 is coupled to the primary winding LP1 in parallel. The excited inductance LM1 is an inductor independent from the primary winding LP1, or the excited inductance LM1 is a stray inductance of the primary winding LP1. An excited current ILM1 passes through the excited inductance LM1 when the resonant converter 100 operates. A first terminal of the inductor LR1 is coupled to the switches SP11, SP12 at a node N11, a second terminal of the inductor LR1 is coupled to the primary winding LP1 at the node N13. A first terminal of the capacitor CR1 is coupled to the primary winding LP1 at the node N14, a second terminal of the capacitor CR1 is coupled to the switch SP12 at the node N12. In operation, a current ILR1 passes through the inductor LR1 when the resonant converter 100 operates. In some embodiments, the resonant network 120 is implemented by LLC resonant network including an inductor, an excited inductance and two capacitors connected in series. A first terminal of the inductor is coupled to the switches SP11, SP12 at a node N11, a second terminal of the inductor is coupled to the primary winding LP1 at the node N13. A connection point of the two capacitor is coupled to the primary winding LP1 at the node N14, two capacitors connected in series is coupled to the node N10 and N12 respectively.

As illustratively shown in FIG. 1, the transformer 130 is a center-tapped transformer including the primary winding LP1 and the secondary winding, wherein the secondary winding includes two coils LN11 and LN12. The secondary winding of the center-tapped transformer includes a first terminal N17, a center-tapped terminal N16 and a second terminal N18. The coils LN11 and LN12 are connected in series at the center-tapped terminal N16 and coupled to the secondary circuit 140. An output voltage is an input voltage times a turns ratio of the secondary winding and the primary winding.

As illustratively shown in FIG. 1, the secondary circuit 140 is implemented by a half bridge circuit including switches SS11 and SS12. A first terminal of the switch SS11 is coupled to the first terminal of the secondary winding N17, and a second terminal switch SS11 is coupled to a first output terminal N15 of the resonant converter 100. A first terminal of the switch SS12 is coupled to the second terminal N18 of the secondary winding, and a second terminal of the switch SS12 is coupled to the second terminal of the switch SS11. The center-tapped terminal N16 is coupled to a second output terminal of the resonant converter 100. The load 109 is coupled the first output terminal and the second output terminal of the resonant converter 100. In some other embodiments, the secondary circuit 140 is implemented by a full bridge circuit as a secondary circuit 340 illustratively shown in FIG. 3.

In some embodiments, the control circuit 150 is coupled to the primary circuit 110 and the secondary circuit 140, and configured to control primary switches SP11 and SP12 of the primary circuit 110 operating with a switching frequency, such as a switching frequency FS described below and shown in FIGS. 5A-5C.

Figure 2:
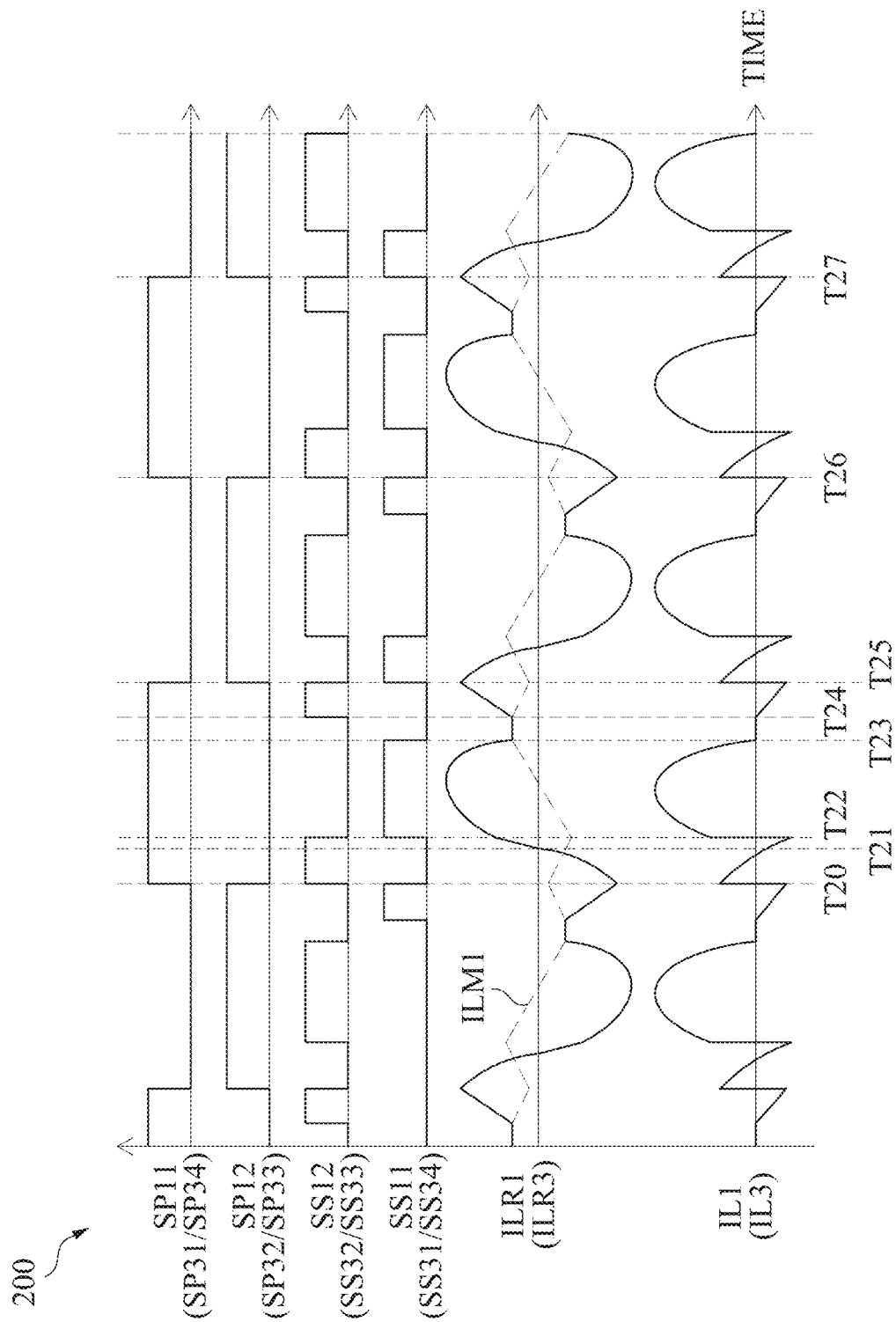
FIG. 2 is a control time sequence diagram of the resonant converter in accordance with some embodiments of the present disclosure.
Figure 4:
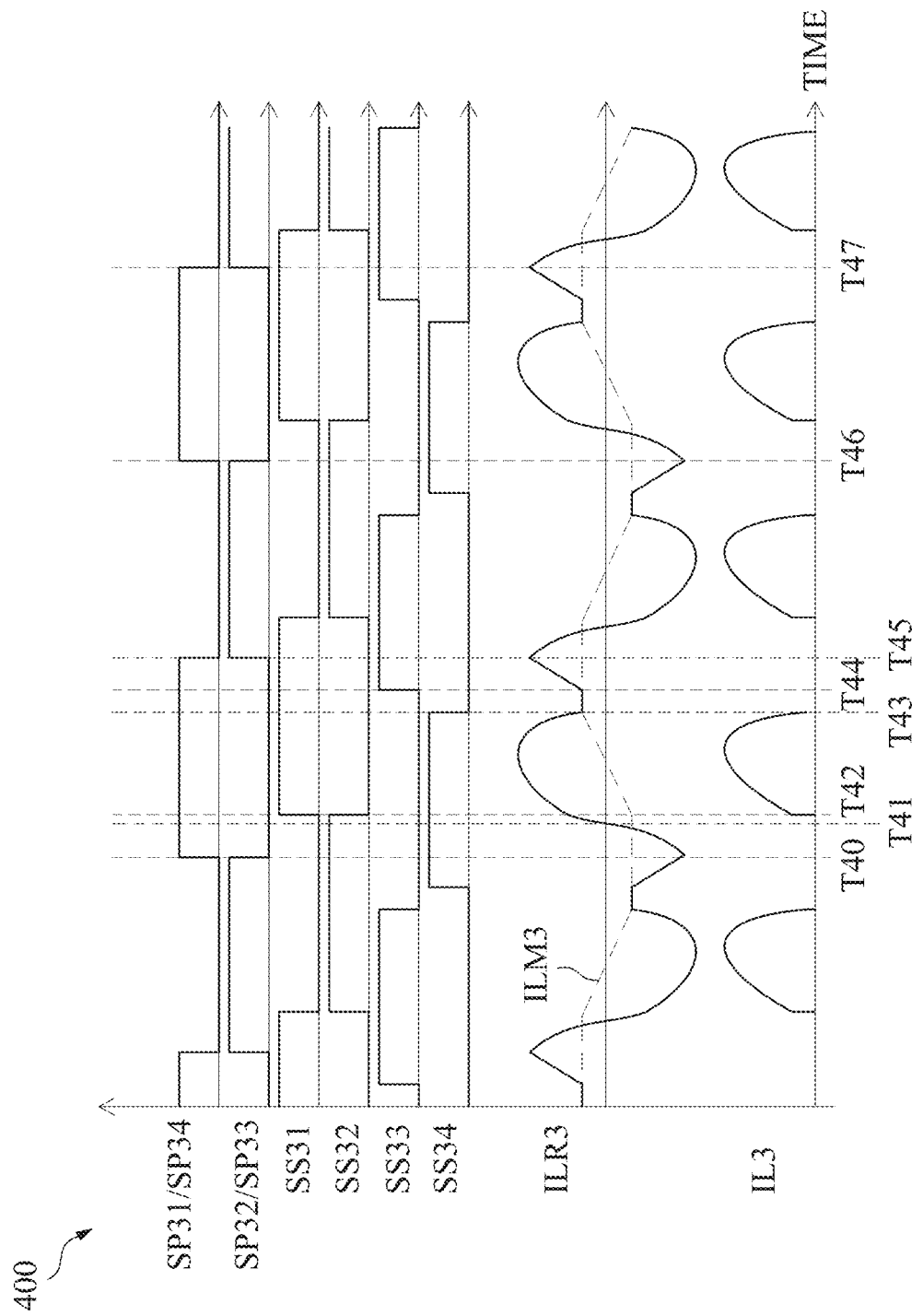
FIG. 4 is a control time sequence diagram of the resonant converter in accordance with some embodiments of the present disclosure.

In some embodiments, at least one of primary switches SP11 and SP12 is configured to be turned on from a first switching moment (e.g. moments T20 and T40 shown in FIGS. 2 and 4) until a second switching moment (e.g. moments T25 and T45 shown in FIGS. 2 and 4).

In some embodiments, the control circuit 150 is configured to control secondary switches SS11, SS12 of the secondary circuit 140, such that at least one of secondary switches SS11, SS12 is turned on during a time interval (e.g. time intervals [T21-T22], [T24-T25], [T41-T42] and [T44-T45] shown in FIGS. 2 and 4) to increase a current ILR1 by clamping secondary winding (e.g. LN11, LN12, LN3 shown in FIGS. 1 and 3) by a preset voltage, in which the preset voltage may be an inverse voltage or equal to zero, such that the electric energy from the input power supply 101 and the secondary circuit 140 is stored in the resonant network 120 to increase the current ILR1 increase the holdup time of the resonant converter 100. When the preset voltage is the inverse voltage, a polarity of the inverse voltage is opposite to a polarity of the induced voltage of the secondary winding. When the secondary winding is short-circuited, the preset voltage is equal to zero. In the holdup time, the output voltage of the resonant converter 100 is maintained in a specified voltage range.

In some embodiments, the control circuit 150 is configured to adjust a first time interval (e.g. time intervals [T21-T22] and [T41-T42]) and/or configured to adjust a second time interval (e.g. time intervals [T24-T25] and [T44-T45]) according to the output voltage VO1, or configured to adjust the first time interval and/or second time interval according to the output voltage VO1 and the input voltage VI1.

In some embodiments, a holdup time of the resonant converter 100 is increased when either the first time interval or the second time interval is increased, such that the output voltage of the resonant converter 100 is maintained in the specific voltage range.

In some embodiments, the control circuit 150 is configured to control the secondary switches SS11 and SS12 to be turned off during the third time interval (e.g. time intervals [T23-T24] and [T43-T44]), after the first time interval and before the second time interval, to adjust the gain of the resonant converter 100 and realize the zero current switching (ZCS) of the switches SS11 and SS12.

In some embodiments, the control circuit 150 is configured to adjust the third time interval according to the output voltage VO1, or configured to adjust the third time interval according to the output voltage VO1 and the input voltage VI1.

In some embodiments, the switches SS11 and SS12 are configured to operate with the switching frequency determined by the control circuit 150. Thus, the switches SS11, SS12 of the secondary circuit 140 and the switches SP11, SP12 of the primary circuit 110 operate with same switching frequencies. In some other embodiments, the switches SS11, SS12 and the switches SP11, SP12 do not operate with same switching frequencies. For example, a switching frequency of the switches SS11, SS12 is positive integer times of the switching frequency of the switches SP11, SP12.

In some embodiments, the coils LN11, LN12 operate as the secondary winding of the transformer 130. The node N16 is referred to as center-tapped terminal of the secondary winding of the transformer 130. The nodes N17 and N18 are referred to as two terminals of the secondary winding of the transformer 130.

As illustratively shown in FIG. 1, the control circuit 150 is configured to control the switches SP11, SP12 of the primary circuit 110 and the switches SS11, SS12 of the secondary circuit 140. In some embodiments, the control circuit 150 is configured to determine a switching frequency, a turn-on time and turn-off time of the switches SP11, SP12 and the switches SS11, SS12 according to the output voltage VO1. In some embodiments, the control circuit 150 is configured to determine the switching frequency, a turn-on time and a turn-off time of the switches SS11, SS12 and the switches SP11, SP12 according to the output voltage VO1 and the input voltage VI1.

For example, the control circuit 150 decreases the switching frequency to increase a gain of the resonant converter 100 when the output voltage is lower than a target voltage. Therefore, the control circuit 150 is configured to adjust the switching frequency until the output voltage is substantially equal to the target voltage.

FIG. 2 is a timing diagram of an operation of the resonant converter 100 in accordance with some embodiments of the present disclosure. As illustratively shown in FIG. 2, a timing diagram 200 illustrates operations of the resonant converter 100 at moments T20-T27.

As illustratively shown in FIG. 2 with reference to FIG. 1, the time sequence diagram 200 illustrates operations of the switches SS11, SS12 and the switches SP11, SP12 at different moments. Furthermore, the time sequence diagram 200 also illustrates current waveforms of the currents IL1, ILR1 and ILM1 with respect to time.

Since the operation of the resonant converter 100 is repeated periodically with the switching frequency, descriptions below focus on operations in a time interval [T20-T25] which has a time length of a half switching period. In half switching periods other than the time interval [T20-T25], operations of the resonant converter 100 are similar to those in the time interval [T20-T25]. For example, in a time interval [T26-T27], the switches SS11, SS12 and the switches SP11, SP12 operates in a same way as the time interval [T20-T25]. In a time interval [T25-T26], the switches SS11, SS12 and the switches SP11, SP12 operates in an opposite way of the time interval [T20-T25], in which the turned on switches and the turned off switches in the time interval [T20-T25] and the time interval [T25-T26] are opposite.

As illustratively shown in FIG. 2, during the time interval [T20-T25], the switch SP11 is configured to be turned on and the switch SP12 is configured to be turned off.

As illustratively shown in FIG. 2, during the time interval [T20-T21], the switch SS12 is configured to be turned on and the switch SS11 is configured to be turned off, such that the current IL1 flows in a direction from the node N16 passing through the coil LN12 to the switch SS12.

During the time interval [T20-T21], the current ILR1 flows in a direction from the node N13 passing through the inductor LR1 to the node N11. Electric energy is transmitted from the inductor LR1 to the capacitor CR1, the input power supply 101 and secondary circuit 140.

In some embodiments, during the time interval [T20-T21], the switch SS12 is configured to be turned off and the switch SS11 is configured to be turned on, such that the current IL1 flows in a direction from the node N17 passing through the coil LN11 to the node N16.

During the time interval [T20-T21], the current ILR1 flows in a direction from the node N13 passing through the inductor LR1 to the node N11. Electric energy is transmitted from the inductor LR1 and the secondary circuit 140 to the capacitor CR1 and the input power supply 101.

As described above, the current ILR1 and the current IL1 approach to zero rapidly at the moment T21.

As illustratively shown in FIG. 2, after the moment T21, the current ILR1 changes a flowing direction, such that during the time interval [T21-T22], the current ILR1 flows in a direction from the node N11 passing through the inductor LR1 to the node N13. The electric energy is transmitted from the input power supply 101, the capacitor CR1 and the secondary circuit 140 to the inductor LR1.

In some embodiment, during the time interval [T21-T22], the secondary winding is clamped by a preset voltage, in which the preset voltage is an inverse voltage. A polarity of the inverse voltage is opposite to the polarity of the induced voltage of the secondary winding, and the current ILR1 is increased quickly from negative value to zero and the current IL1 is decreased from the positive value to zero due to the inverse voltage. The electric energy is transmitted to the resonant network 120 from the input supply 101 and the secondary circuit 140.

As illustratively shown in FIG. 2, during the time interval [T21-T22], the switch SS12 is configured to be turned on and the switch SS11 is configured to be turned off, such that the current IL1 flows in a direction from the switch SS12 passing through the coil LN12 to the node N16. The coil LN12 is clamped by an inverse voltage, in which the polarity of the inverse voltage is opposite to the polarity of the induced voltage of coil LN12, and the current ILR1 is increased in the first direction and the current IL1 is increased in the second direction. The electric energy is transmitted from the input supply 101 and the secondary circuit 140 to the resonant network 120. In one embodiment, the inverse voltage is the same as the output voltage of the resonant converter 100.

As described above, due to the electric energy being transmitted from the input supply 101 and the secondary circuit 140 to the resonant network 120, the current ILR1 is increased rapidly by turning on the switch SS12 during the time interval [T21-T22]. The current ILR1 approaches to a desired current rapidly by the operations described above during the time interval [T21-T22].

In some embodiments, the control circuit 150 is configured to control the switches SS11, SS12 to adjust the current ILR1. In the embodiments corresponding to FIG. 2, the moment T22 is defined by the moment that the switch SS12 is turned off during the time interval [T21-T23]. In other words, the control circuit 150 is configured to determine the moment T22 by turning off the switch SS12 during the time interval [T21-T23]. For example, the control circuit 150 is configured to turn on the switch SS12 for a longer period before turn off the switch SS12, such that a length of the time interval [T21-T22] is increased correspondingly. As a result, the current ILR1 is increased in the first direction for the longer time interval [T21-T22], and the holdup time is increased.

As described above, the control circuit 150 is configured to adjust the current ILR1. Therefore, by controlling the switches SS11, SS12 to adjust the time interval [T21-T22], the control circuit 150 is configured to adjust the current ILR1, so that the output voltage is increased until the output voltage is substantially equal to a target voltage which is desired.

As illustratively shown in FIG. 2, during the time interval [T22-T23], the current ILR1 flows in a direction from the node N11 passing through the inductor LR1 to the node N13. During the time interval [T22-T23], the electric energy is transmitted from the resonant network 120 and the input power supply 101 to the secondary circuit 140 via the transformer 130.

During the time interval [T22-T23], the switch SS12 is configured to be turned off and the switch SS11 is configured to be turned on, such that the current IL1 flows in a direction from the node N16 passing through the coil LN11 to the switch SS11. The electric energy is transmitted from the resonant network 120 and the input power supply 101 to the secondary circuit 140 via the transformer 130.

As illustratively shown in FIG. 2, during the time interval [T23-T24], the current ILR1 flows in a direction from the node N11 passing through the inductor LR1 to the node N13. During the time interval [T23-T24], the electric energy is transmitted from the power supply 101 to the capacitor CR1. The inductor LR1 and the capacitor CR1 of the resonant network 120 are in a resonant state.

During the time interval [T23-T24], the switches SS11 and SS12 are configured to be turned off, such that the current IL1 is substantially equal to zero. During the time interval [T23-T24] which is from the moment T23 until the moment T24, the control circuit 150 is configured to adjust the gain of the resonant converter 100 and control the switches SS11 and SS12 to be turned off to realize the ZCS of the switches SS11 and SS12.

In some embodiments, the control circuit 150 is configured to adjust the time interval [T23-T24] according to the output voltage VO1, or the control circuit 150 is configured to adjust the time interval [T23-T24] according to the output voltage VO1 and the input voltage VI1.

As illustratively shown in FIG. 2, during the time interval [T24-T25], the current ILR1 flows in a direction from the node N11 passing through the inductor LR1 to the node N13.

During the time interval [T24-T25], the switch SS12 is configured to be turned on and the switch SS11 is configured to be turned off, such that the current IL1 flows in a direction from the switch SS12 passing through the coil LN12 to the node N16.

In some embodiments, during the time interval [T24-T25], the coil LN12 is clamped by an inverse voltage, and the current ILR1 is increased in the first direction and the current IL1 is increased in the second direction due to the inverse voltage. The electric energy is transmitted from the secondary circuit 140 and the input power supply 101 to the resonant network 120.

As described above, due to the electric energy being transmitted from the power supply 101 and the secondary circuit 140 to the resonant network 120, the current ILR1 is increased during the time interval [T24-T25].

In some embodiments, the control circuit 150 is configured to control the switches SS11, SS12 to adjust the time interval [T24-T25], such that the current ILR1 is increased to increase the holdup time. In the embodiments corresponding to FIG. 2, the moment T24 is defined by the moment that the switch SS12 turned on during the time interval [T23-T25]. In other words, the control circuit 150 is configured to determine the moment T24 by turning on the switch SS12 during the time interval [T23-T25]. For example, the control circuit 150 is configured to turn on the switch SS12 earlier in the time interval [T23-T25], such that the moment T24 is moved backward in time and a length of the time interval [T24-T25] is increased correspondingly. As a result, the current ILR1 is increased for the longer time interval [T24-T25].

In some embodiments, when the moment T24 is moved forward in time, a length of the time interval [T23-T24] is decreased correspondingly. In other words, the control circuit 150 is configured to control the time interval [T23-T24] by adjusting the moment T24.

Similarly, in some embodiments, the moment T22 is defined by the moment that the switch SS12 turned off and the switch SS11 turned on during the time interval [T21-T23]. The control circuit 150 is configured to determine the moment T22 by turning on the switch SS11 during the time interval [T21-T23]. For example, the control circuit 150 is configured to turn on the switch SS11 later in the time interval [T21-T23], such that the moment T22 is moved forward in time and a length of the time interval [T21-T22] is increased correspondingly. As a result, the current ILR1 is increased for the longer time interval [T21-T22] to increase the holdup time.

As described above, the control circuit 150 is configured to adjust the current ILR1. Therefore, by controlling the switches SS11, SS12 to adjust the time interval [T24-T25], the control circuit 150 is configured to adjust the output voltage until the output voltage is substantially equal to a preset voltage which is desired.

In some other embodiments, the operations in the time interval [T20-T25] described above are implemented by a resonant converter 300 described below. When the resonant converter 300 operates according to the operations described above, operations of switches SP31-SP34 and SS31-SS34 of the resonant converter 300 are described as following: the switches SP31 and SP34 operate as the switch SP11, the switches SP32 and SP33 operate as the switch SP12, the switches SS32 and SS33 operate as the switch SS12, and the switches SS31 and SS34 operate as the switch SS11.

In some other embodiments, the operations in the time interval [T20-T25] described above are implemented by a resonant converter 300 described below. When the resonant converter 300 operates according to the operations described above, operations of switches SP31-SP34 and SS31-SS34 of the resonant converter 300 are described as following: the switches SP31 and SP34 operate as the switch SP11, the switches SP32 and SP33 operate as the switch SP12, the switches SS32 and SS33 operate as the switch SS12, and the switches SS31 and SS34 operate as the switch SS11. Further details are described below.

Figure 3:
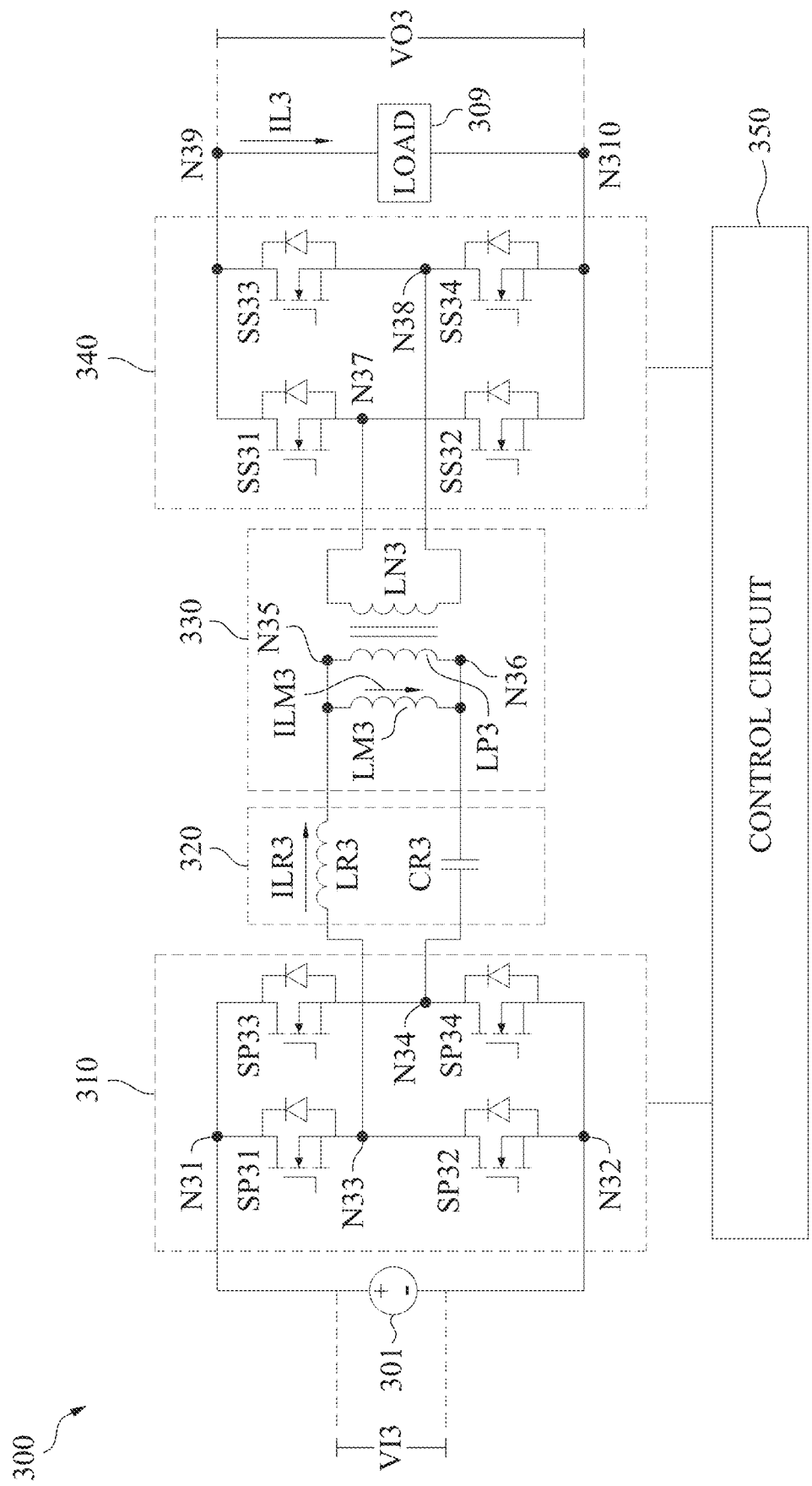
FIG. 3 is a circuit diagram of a resonant converter in accordance with some embodiments of the present disclosure.

FIG. 3 is a circuit diagram of a resonant converter 300 in accordance with some embodiments of the present disclosure. As illustratively shown in FIG. 3, the resonant converter 300 is configured to receive an input voltage V13 and provide an output voltage VO3 to a load 309. The resonant converter 300 includes a primary circuit 310, a resonant network 320, a transformer 330, a secondary circuit 340 and a control circuit 350. The configurations and operations of components of resonant converter 300 are similar to those of the resonant converter 100 in FIG. 1. Therefore, some descriptions are not repeated in embodiments associated with FIG. 3 for brevity.

As illustratively shown in FIG. 3, the primary circuit 310 is implemented by a full bridge circuit including switches SP31-SP34. The switches SP31, SP32 are coupled in series. The switches SP31, SP32 are coupled to an input power supply 301 at nodes N31 and N32, respectively. The switches SP33, SP34 are coupled in series. The switches SP33, SP34 are also coupled to the input power supply 301 at the nodes N31 and N32, respectively. In some embodiments, the switches SP31-SP34 are configured to operate with a switching frequency determined by the control circuit 350. In some other embodiments, the primary circuit 310 is implemented by a half bridge circuit as the primary circuit 110 illustratively shown in FIG. 1.

As illustratively shown in FIG. 3, the resonant network 320 includes an inductor LR3, an excited inductance LM3 and a capacitor CR3, in which the excited inductance LM3 can be implemented as an independent inductor or a stray inductance of a primary winding LP3. A first terminal of the inductor LR3 is coupled to the switches SP31, SP32 at a node N33, and a second terminal of the inductor LR3 is coupled to the primary winding LP3 of the transformer 330 at the node N35. A first terminal of the capacitor CR3 is coupled to the switches SP33, SP34 at the node N34 and a second terminal of the capacitor CR3 is coupled to the primary winding LP3 at the node N36. In operation, a current ILR3 passes through the inductor LR3 when the resonant converter 300 operates.

As illustratively shown in FIG. 3, the transformer 330 includes the primary winding LP3 and a secondary winding LN3. A first terminal of the primary winding LP3 is coupled to the inductor LR3 at a node N35, and a second terminal of the primary winding LP3 is coupled to the capacitor CR3 at a node N36. The second winding LN3 is coupled to the secondary circuit 340. In operation, a current ILM3 passes through the excited inductance LM3 when the resonant converter 300 operates. In some embodiments, the voltage at the secondary winding LN3 is induced by the voltage at the primary winding LP3.

As illustratively shown in FIG. 3, the secondary circuit 340 is implemented by a full bridge circuit including switches SS31-SS34. The switches SS31-SS34 are coupled in series. The switches SS31, SS32 are coupled to the secondary winding LN3 at a node N37. The switches SS33, SS34 are coupled to the secondary winding LN3 at a node N38. The switches SS31, SS33 are coupled to a first output terminal of the resonant converter 300 at a node N39. The switches SS32, SS34 are coupled to a second output terminal of the resonant converter 300 at a node N310. The node N39 and the node N310 are coupled to a load 309. In some other embodiments, the secondary circuit 340 is implemented by a half bridge circuit as the secondary circuit 140 illustratively shown in FIG. 1.

In some embodiments, the switches SS31-SS34 are configured to operate with the switching frequency determined by the control circuit 150. Thus, the switches SS31-SS34 and the switches SP31-SP34 of the primary circuit 310 may operate with same switching frequencies. In some other embodiments, the switches SS31-SS34 and the switches SP31-SP34 do not operate with same switching frequencies. For example, a switching frequency of the switches SS31-SS34 is positive integer times of the switching frequency of the switches SP31-SP34.

As illustratively shown in FIG. 3, the control circuit 350 is configured to control the switches SP31-SP34 of the primary circuit 310 and the switches SS31-SS34 of the secondary circuit 340. In some embodiments, the control circuit 350 is configured to determine the switching frequency, the turn-on time and the turn-off time of the switches SS31-SS34 and the switches SP31-SP34 according to the output voltage VO3. In some embodiments, the control circuit 350 is configured to determine the switching frequency, the turn-on time and the turn-off time of the switches SP31-SP34 and the switches SS31-SS34 according to the output voltage VO3 and input voltage VI3.

For example, the control circuit 350 decreases the switching frequency to increase a gain of the resonant converter 300. Therefore, the control circuit 350 is configured to adjust the switching frequency to adjust the gain of the resonant converter 300.

In some embodiments, operations of the resonant converter 300 are described by the timing diagram 200.

As illustratively shown in FIG. 3 reference to FIG. 2, during the time interval [T20-T25], the switches SP31 and SP34 are configured to be turned on and the switches SP32 and SP33 are configured to be turned off.

As illustratively shown in FIG. 2, during the time interval [T20-T21], the switches SS32 and SS33 are configured to be turned on and the switches SS31 and SS34 are configured to be turned off, such that the current IL3 flows in a direction from the node N37 passing through the secondary winding LN3 to the node N38. The electric energy is transmitted from the inductor LR3 to the capacitor CR3, the input power supply 301 and the secondary circuit 340.

During the time interval [T20-T21], the current ILR3 flows in a direction from the node N35 passing through the inductor LR3 to the node N33.

In some embodiments, during the time interval [T20-T21], the switches SS32 and SS33 are configured to be turned off and the switches SS31 and SS34 are configured to be turned on, such that the current IL3 flows in a direction from the node N37 passing through the secondary winding LN3 to the node N38. The electric energy is transmitted from the secondary circuit 340 and the inductor LR3 to the capacitor CR3 and the input power supply 301.

During the time interval [T20-T21], the current ILR3 flows in a direction from the node N35 passing through the inductor LR3 to the node N33.

As described above, due to the electric energy being transmitted from the inductor LR3 and the secondary circuit 340 to the capacitor CR3 and the input power supply 301, the current ILR3 approaches to zero rapidly during the time interval [T20-T21].

As illustratively shown in FIG. 2, during the time interval [T20-T21], the current ILR3 increases from a negative value to zero. After the moment T21, the current ILR3 changes a flowing direction, such that during the time interval [T21-T22], the current ILR3 flows in a direction from the node N33 passing through the inductor LR3 to the node N35.

In some embodiment, during the time interval [T21-T22], the secondary winding LN3 is clamped by an inverse voltage, and the current ILR3 is increased in the first direction and the output current IL3 is increased in the second direction due to the inverse voltage. The electric energy is transmitted to the resonant network 320 from the input power supply 301 and the secondary circuit 340.

As illustratively shown in FIG. 2, during the time interval [T21-T22], the switches SS32 and SS33 are configured to be turned on and the switch SS31 and SS34 are configured to be turned off, such that the current IL3 flows from the node N38 passing through the secondary winding LN3 to the node N37. The electric energy is transmitted to the resonant network 320 from the input power supply 301 and the secondary circuit 340.

As described above, due to the electric energy is transmitted to the resonant network 320 from the input power supply 301 and the secondary circuit 340, the current ILR3 is increased rapidly in the first direction and the current IL3 is increased in the second direction by turning on the switches SS32 and SS33 during the time interval [T21-T22]. The current ILR3 approaches to a desired current rapidly by the operations described above during the time interval [T21-T22].

During the time interval [T22-T23], the switches SS32 and SS33 are configured to be turned off and the switches SS31 and SS34 are configured to be turned on, such that the current IL3 flows in a direction from the node N38 passing through the secondary winding LN3 to the node N37. The electric energy is transmitted from the input power supply 301 and the resonant network 340 to the secondary circuit 340.

As illustratively shown in FIG. 2, during the time interval [T23-T24], the current ILR3 flows in a direction from the node N33 passing through the inductor LR3 to the node N35. During the time interval [T23-T24], the electric energy is transmitted from the power supplier 301 to the resonant network 320. The inductor LR3 and the capacitor CR3 of the resonant network 320 are in a resonant state.

During the time interval [T23-T24], the switches SS31-SS34 are configured to be turned off, such that the current IL3 is substantially equal to zero.

As illustratively shown in FIG. 2, during the time interval [T24-T25], the current ILR3 flows in a direction from the node N33 passing through the inductor LR3 to the node N35.

During the time interval [T24-T25], the switches SS32 and SS33 is configured to be turned on and the switches SS31 and SS34 is configured to be turned off, such that the current IL3 flows from the node N38 passing through the secondary winding LN3 to the node N37.

In some embodiments, the current IL3 passes through the secondary winding LN3, and a induced voltage between the nodes N37 and N38 of the secondary winding LN3 is clamped by the inverse voltage. During the time interval [T24-T25], the secondary winding LN3 is clamped by the inverse voltage, in which the inverse is the same as the output voltage of the resonant converter 300, and the current ILR3 is increased in the first direction and the current IL3 is increased in the second direction due to the inverse voltage. The electric energy is transmitted from the secondary circuit 340 and the input power supply 301 to the resonant network 320.

As described above, due to the electric energy being transmitted from the power supply 301 and the secondary circuit 340 to the resonant network 320, the current ILR3 is increased during the time interval [T24-T25] to increase the holdup time of the resonant converter 300.

In some embodiments, the control circuit 350 is configured to control the switches SS31-SS34 to adjust the output voltage by adjusting the current ILR3. The operations of the control circuit 350 are similar to those of the control circuit 150 as described above. Therefore, some descriptions are not repeated for brevity.

FIG. 4 is a time sequence diagram of an operation of the resonant converter 300 in accordance with some embodiments of the present disclosure. As illustratively shown in FIG. 4, a timing diagram 400 illustrates operations of the resonant converter 300 at moments T40-T47.

As illustratively shown in FIG. 4 with reference to FIG. 3, the time sequence diagram 400 illustrates operations of the switches SP31-SP34 and the switches SS31-SS34 at different moments. Furthermore, the timing diagram 400 also illustrates current waveforms of the currents IL3, ILR3 and ILM3 with respect to time.

Since the operation of the resonant converter 300 is repeated periodically with the switching frequency, descriptions below focus on operations in a time interval [T40-T45] between a moment T40 and a moment T45 which has a time length of a half switching period. The resonant converter 300 operates in similar ways in other half switching periods. For example, in a time interval [T46-T47], the switches SP31-SP34 and the switches SS31-SS34 operates as same as the time interval [T40-T45]. In a time interval [T45-T46], the switches SP31-SP34 and the switches SS31-SS34 operates in an opposite way of the time interval [T40-T45], in which the turned on switches and the turned off switches in the time interval [T40-T45] and the time interval [T45-T46] are opposite.

As illustratively shown in FIG. 4, during the time interval [T40-T41], the current ILR3 flows in a direction from the node N35 passing through the inductor LR3 to the node N33. When the secondary winding LN3 is short-circuited, electric energy is transmitted from the inductor LR3 to the capacitor CR3 and the input power supply 301.

As described above, due to the secondary winding LN3 is short-circuited, the electric energy being transmitted to the capacitor CR3 and the input power supply 301 from the inductor LR3, the current ILR3 increases from a negative value zero rapidly and the current IL3 decreases from a positive value to zero rapidly during the time interval [T40-T41].

In some other embodiments, the switches SS31, SS34 forms a first switch group, the switches SS32, SS33 forms a second switch group, and the switches SS31, SS33 forms a third switch group, the switches SS32, SS34 forms a fourth switch group. In some embodiments, during the time interval [T40-T41], one of the third switch group and the fourth switch group is turned on, the secondary winding LN3 is short-circuited. In some embodiments, the fourth switch group (the switches SS32, SS34) is configured to be turned on and the third switch group (the switches SS31, SS33) is configured to be turned off to short-circuit the secondary winding LN3. Electric energy is transmitted from the inductor LR3 to the capacitor CR3 and the input power supply 301. In some other embodiments, the fourth switch group (the switches SS32, SS34) is configured to be turned off and the third switch group (the switches SS31, SS33) is configured to be turned on to short-circuit the secondary winding LN3. Electric energy is transmitted from the inductor LR3 to the capacitor CR3 and the input power supply 301.

In some other embodiments, during the time interval [T40-T41], the first switch group is turned on and the second switch group is turned off, the secondary winding LN3 is clamped by the inverse voltage. In some embodiments, the second switch group (the switches SS32, SS33) is configured to be turned off and the first switch group (the switches SS31, SS34) is configured to be turned on, such that the current IL3 flows in a direction from the node N37 passing through the secondary winding LN3 to the node N38. The electric energy is transmitted from the inductor LR3 and the secondary circuit 340 to the capacitor CR3 and the input power supply 301.

In some other embodiments, during the time interval [T40-T41], the first switch group is turned off and the second switch group is turned on. For example, the second switch group (the switches SS32, SS33) is configured to be turned on and the first switch group (the switches SS31, SS34) is configured to be turned off, such that the current IL3 flows in a direction from the node N37 passing through the secondary winding LN3 to the node N38. The electric energy is transmitted from the inductor LR3 to the capacitor CR3, the input power supply 301 and the secondary circuit 340.

As illustratively shown in FIG. 4, at the moment T41, the current ILR3 approaches to zero. After the moment T41, the current ILR3 changes a flowing direction, such that during the time interval [T41-T42], the current ILR3 flows in a direction from the node N33 passing through the inductor LR3 to the node N35.

As illustratively shown in FIG. 4, during the time interval [T41-T42], the secondary winding LN3 is short-circuited or clamped by an inverse voltage. When the secondary winding LN3 is short-circuited, the current IL3 passing through the load 309 is substantially equal to zero.

During the time interval [T41-T42], the secondary winding LN3 is short-circuited, electric energy is transmitted from the power supply 301 and the capacitor CR3 to the inductor LR3. When the secondary winding LN3 is clamped by the inverse voltage, electric energy is transmitted from the secondary circuit 340, the capacitor CR3 and the input power supply 301 to the inductor LR3.

As described above, due to the electric energy being transmitted to the inductor LR3, the current ILR3 is increased rapidly in the first direction and the current IL3 is increased in the second direction during the time interval [T41-T42].

In some other embodiments, the switches SS31, SS34 forms a first switch group, the switches SS32, SS33 forms a second switch group, and the switches SS31, SS33 forms a third switch group, the switches SS32, SS34 forms a fourth switch group. In some embodiments, during the time interval [T41-T42], one of the third switch group and the fourth switch group to be turned on, such that the secondary winding LN3 is short-circuited. In some embodiments, the fourth switch group (the switches SS32, SS34) is configured to be turned on and the third switch group (the switches SS31, SS33) is configured to be turned off to short-circuit the secondary winding LN3. The electric energy is transmitted from the power supply 301 and the capacitor CR3 to the inductor LR3. In some other embodiments, the fourth switch group (the switches SS32, SS34) is configured to be turned off and the third switch group (the switches SS31, SS33) is configured to be turned on to short-circuit the secondary winding LN3. The preset voltage is equal to zero, and the current IL3 is equal to zero. The electric energy is transmitted from the power supply 301 and the capacitor CR3 to the inductor LR3.

In some other embodiments, during the time interval [T41-T42], the second switch group to be turned on, such that the secondary winding LN3 is clamped by the inverse voltage. In some embodiments, the second switch group (the switches SS32, SS33) is configured to be turned on and the first switch group (the switches SS31, SS34) is configured to be turned off. The current IL3 flows in a direction from the node N38 passing through the secondary winding LN3 to the node N37. The electric energy is transmitted from the power supply 301, the capacitor CR3 and the secondary circuit 340 to the inductor LR3.

In some embodiments, the control circuit 350 is configured to control the switches SS31-SS34 to adjust the current ILR3. In the embodiments corresponding to FIG. 4, the moment T42 is defined by the moment that the switch SS32 is turned off during the time interval [T41-T43]. In other words, the control circuit 350 is configured to determine the moment T42 by turning off the switch SS32 during the time interval [T41-T43]. For example, the control circuit 350 is configured to turn on the switches SS32, SS34 and turn off the switches SS31, SS33 for a longer period before turn off the switch SS32, such that a length of the time interval [T41-T42] is increased correspondingly. As a result, the current ILR3 is increased rapidly in the first direction for the longer time interval [T41-T42].

As described above, the control circuit 350 is configured to adjust the current ILR3. Therefore, by controlling the switches SS31-SS34 during the time interval [T40-T42], the control circuit 350 is configured to adjust the output voltage until the output voltage is substantially equal to a target voltage which is desired.

As illustratively shown in FIG. 4, during the time interval [T42-T43], the switches SS32, SS33 are configured to be turned off and the switches SS31, SS34 are configured to be turned on, such that the current IL3 flows in a direction from the node N38 passing through the secondary winding LN3 to the node N37.

During the time interval [T42-T43], the current ILR3 flows in a direction from the node N33 passing through the inductor LR3 to the node N35. During the time interval [T42-T43], the electric energy is transmitted from the power supply 301 and the resonant network 320 to the secondary circuit 340.

As illustratively shown in FIG. 4, during the time interval [T43-T44], at least three switches (i.e., the switches SS32-SS34) are configured to be turned off, such that the current IL3 is substantially equal to zero.

During the time interval [T43-T44], the current ILR3 flows in a direction from the node N33 passing through the inductor LR3 to the node N35. During the time interval [T43-T44], the electric energy is transmitted from the power supply 301 to the resonant network 320. The inductor LR3 and the capacitor CR3 of the resonant network 320 are in a resonant state. The gain of the resonant converter 300 is adjusted and the switches SS31-SS34 can realize the ZCS.

In the embodiments, corresponding to FIG. 4, the moment T43 is defined by the moment that the switch SS33 is turned on and the moment that the switch SS34 is turned off. The moment T43 can be adjusted.

As illustratively shown in FIG. 4, during the time interval [T44-T45], the secondary winding LN3 is short-circuited or clamped by an inverse voltage. When the secondary winding LN3 is short-circuited, the current IL3 passing through the load 309 is substantially equal to zero.

In some embodiments, during the time interval [T44-T45], one of the third switch group and the fourth switch group to be turned on, such that the secondary winding LN3 is short-circuited. In some embodiments, the fourth switch group (the switches SS32, SS34) is configured to be turned off and the third switch group (the switches SS31, SS33) is configured to be turned on to short-circuit the secondary winding LN3, such that the current IL3 is substantially equal to zero.

During the time interval [T44-T45], the current ILR3 flows in a direction from the node N33 passing through the inductor LR3 to the node N35. The electric energy is transmitted from the power supply 301 to the resonant network 320.

In some other embodiments, during the time interval [T44-T45], the fourth switch group (the switches SS32, SS34) is configured to be turned on and the third switch group (the switches SS31, SS33) is configured to be turned off to short-circuit the secondary winding LN3. The electric energy is transmitted from the power supply 301 to the resonant network 320.

In some other embodiments, during the time interval [T44-T45], the second switch group (the switches SS32, SS33) is configured to be turned on and the first switch group (the switches SS31, SS34) are configured to be turned off, such that the current IL3 flows in a direction from the node N38 passing through the secondary winding LN3 to the node N37. The secondary winding LN3 is clamped by the inverse voltage. The electric energy is transmitted from power supply 301 and the secondary circuit 340 to the resonant network 320.

As described above, due to the electric energy being transmitted from the power supply 301 and/or the secondary circuit 340 to the resonant network 320, the current ILR3 is increased in the first direction during the time interval [T44-T45], such that holdup time of the resonant converter 300 is increased.

In some embodiments, the control circuit 350 is configured to control the switches SS31-SS34 to adjust the current ILR3 to increase the holdup time of the resonant converter 300. In the embodiments corresponding to FIG. 4, the moment T44 is defined by the moment that the switch SS33 is turned on during the time interval [T43-T45]. In other words, the control circuit 350 is configured to determine the moment T44 by turning on the switch SS33 during the time interval [T43-T45]. For example, the control circuit 350 is configured to turn on the switch SS33 earlier in the time interval [T43-T45], such that the moment T44 is moved backward in time and a length of the time interval [T44-T45] is increased correspondingly. As a result, the current ILR3 is increased for the longer time interval [T44-T45]. In some other embodiments, the control circuit 350 is configured to turn on the switch SS33 before the moment T43 to further increase the current ILR3.

In some embodiments, when the moment T44 is moved forward in time, a length of the time interval [T44-T45] is decreased correspondingly. In other words, the control circuit 350 is configured to control the time interval [T44-T45] by adjusting the moment T44.

Similarly, in some embodiments, the moment T42 is defined by the moment that the switch SS32 turned off and the switch SS31 turned on during the time interval [T41-T43]. The control circuit 350 is configured to determine the moment T42 by turning on the switch SS31 and turning off the switch SS32 during the time interval [T41-T43]. For example, the control circuit 350 is configured to turn on the switch SS31 and turn off the switch SS32 later in the time interval [T41-T43], such that the moment T42 is moved forward in time and a length of the time interval [T41-T42] is increased correspondingly. As a result, the current ILR3 is increased for the longer time interval [T41-T42] to increase the holdup time.

As described above, the control circuit 350 is configured to adjust the current ILR3. Therefore, by controlling the switches SS31-SS34 during the time interval [T44-T45], the control circuit 350 is configured to adjust the output voltage until the output voltage is substantially equal to a target voltage which is desired.

Figure 5A:
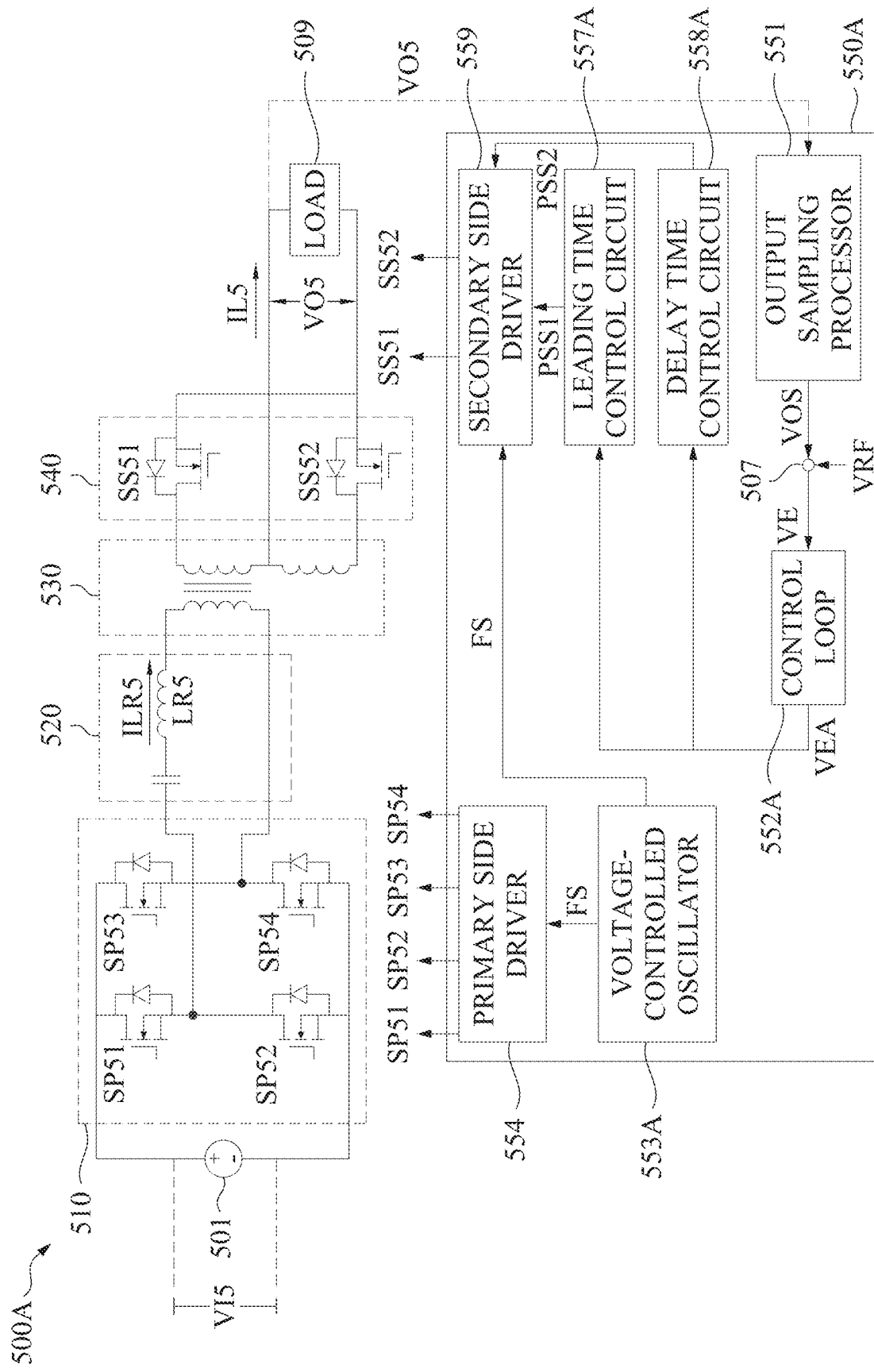
FIG. 5A is a circuit diagram of a resonant converter with a control circuit in accordance with some embodiments of the present disclosure.

FIG. 5A is a circuit diagram of a resonant converter 500A in accordance with some embodiments of the present disclosure. As illustratively shown in FIG. 5A, the resonant converter 500A is coupled to an input power supply 501 to receive an input voltage V15. The resonant converter 500A is configured to receive the input voltage V15 and provide an output voltage VO5 to a load 509. The resonant converter 500A includes a primary circuit 510, a resonant network 520, a transformer 530, a secondary circuit 540 and a control circuit 550A. The configurations and operations of components of resonant converter 500A are similar to those of the resonant converter 100 in FIG. 1 and the resonant converter 300 in FIG. 3. Therefore, some descriptions are not repeated in embodiments associated with FIG. 5A for brevity.

As illustratively shown in FIG. 5A, the primary circuit 510 is implemented by a full bridge circuit including switches SP51-S54. The configurations and operations of the primary circuit 510 are similar to those of the primary circuit 310 in FIG. 3. Therefore, some descriptions are not repeated for brevity. In some embodiments, the switches SP51-SP54 are configured to operate with a switching frequency FS determined by the control circuit 550A. In some other embodiments, the primary circuit 510 is implemented by a half bridge circuit as the primary circuit 110 illustratively shown in FIG. 1.

As illustratively shown in FIG. 5A, the resonant network 520 includes an inductor LR5. In operation, a current ILR5 passes through the inductor LR5 when the resonant converter 500A operates.

As illustratively shown in FIG. 5A with reference to FIG. 1, the configuration and operation of the transformer 530 are similar to those of the transformer 130 in FIG. 1. Therefore, some descriptions are not repeated for brevity.

As illustratively shown in FIG. 5A, the secondary circuit 540 is implemented by a half bridge circuit including switches SS51 and SS52. The first terminal of the first switch SS51 is coupled to the first terminal of the secondary winding, the second terminal of the first switch SS51 is coupled to the second terminal of the second switch SS52, the first terminal of the second switch SS52 is coupled to the second terminal of the secondary winding, the second terminal of the first switch SS51 is coupled to the second output terminal of the resonant converter, and the center-tapped terminal of the secondary winding is coupled to the first output terminal of the resonant converter 500A. The configuration and operation of the secondary circuit 540 are similar to that of the secondary circuit 140 in FIG. 1. Differences between FIG. 1 and FIG. 5 are described following. During the time interval [T21-T22], the switch SS52 is configured to be turned off and the switch SS51 is configured to be turned on, such that the current IL5 flows in a direction from the load passing through secondary winding to the switch SS51. The secondary winding is clamped by an inverse voltage, and the current ILR5 is increased in the first direction and the current IL5 is increased in the second direction due to the inverse voltage. The electric energy is transmitted from the input supply 501 and the secondary circuit 540 to the resonant network 520. During the time interval [T24-T25], the switch SS52 is configured to be turned off and the switch SS51 is configured to be turned on, such that the current IL5 flows in a direction from the load passing through secondary winding to the node switch SS51. The secondary winding is clamped by the inverse voltage, and the current ILR5 is increased in the first direction and the current IL5 is in the second direction due to the inverse voltage. Therefore, same descriptions are not repeated for brevity. In some embodiments, the switches SS51 and SS52 are configured to operate with the switching frequency FS provided by the control circuit 550A. In some other embodiments, the secondary circuit 540 is implemented by a full bridge circuit as the secondary circuit 340 illustratively shown in FIG. 3.

As illustratively shown in FIG. 5A, the control circuit 550A includes a voltage-controlled oscillator, a primary side driver, an output sampling processor 551, a comparator 507, a control loop 552A, a voltage-controlled oscillator 553A, a primary side driver 554, a leading time control circuit 557A, a delay time control circuit 558A and a secondary side driver 559.

In some embodiments, the control circuit 550A is configured to adjust the first time interval and/or the second time interval according to the output voltage VO5 and the switching frequency FS.

In some embodiments, the output sampling processor 551 is configured to receive the output voltage VO5 and provide a scaled output voltage VOS according to the output voltage VO5. The output sampling processor 551 calculates and generates the scaled output voltage VOS according to the output voltage VO5, in which the scaled output voltage VOS and the output voltage VO5 are a certain proportional relation.

In some embodiments, the comparator 507 is configured to compare the scaled output voltage VOS with a reference voltage VRF and generate an error signal VE. The error signal VE corresponds to a difference between the scaled output voltage VOS and the reference voltage VRF. In some embodiments, the reference voltage VRF may be replaced by a reference current, or a reference power. The control circuit 550A is configured to adjust the output voltage, such that the scaled output voltage is substantially equal to the reference voltage.

In some embodiments, the control loop 552A is configured to receive the error signal VE and provide a control signal VEA.

In some embodiments, the leading time control circuit 557A is configured to receive the control signal VEA and provide a phase-shifting signal PSS1. In various embodiments, the phase-shifting signal PSS1 corresponds to the time length of the time interval [T24-T25] or the time interval [T44-T45].

In some embodiments, the delay time control circuit 558A is configured to receive the control signal VEA and provide a phase-shifting signal PSS2. In various embodiments, the phase-shifting signal PSS2 corresponds to the time length of the time interval [T21-T22] or the time interval [T41-T42].

In some embodiments, the voltage-controlled oscillator 553A is configured to provide the switching frequency FS.

In some embodiments, the switching frequency FS is substantially equal to a preset frequency. In some other embodiments, the voltage-controlled oscillator 553A is configured to adjust the output voltage VO5 by adjusting the first phase-shifting signal PSS1 and the second phase-shifting signal PSS2.

In some embodiments, the primary side driver 554 is configured receive the switching frequency FS and drive the switches SP51-SP54 according to the switching frequency FS. The primary side driver 554 provide primary driving signals to drive the switches SP51-54 operating with the switching frequency FS.

In some embodiments, the secondary side driver 559 is configured to receive the switching frequency FS and the phase-shifting signals PSS1, PSS2, and drive the switches SS51 and SS52, such that the first switch SS51 is turned on during the first time interval (e.g. time intervals [T21-T22] and [T41-T42]) and the first switch SS51 is turned on during the second time interval (e.g. time intervals [T24-T25] and [T44-T45]). The secondary side driver 559 provides secondary driving signals to drive the switches SS51 and SS52 according to the switching frequency FS and the phase-shifting signals PSS1, PSS2.

In some embodiments, when the input power supply goes down and the scaled output voltage is lower than the reference voltage VRF, the leading time control circuit 557A is configured to adjust the first phase-shifting signal PSS1 and the delay time control circuit 558A is configured to adjust the second phase-shifting signal PSS2. The secondary side driver 559 drives the first switch SS51 to be turned on and the second switch SS52 to be turned off during the first time interval (e.g. time intervals [T21-T22] and [T41-T42]) and the second time interval (e.g. time intervals [T24-T25] and [T44-T45]). In some embodiments, the preset frequency FM is determined by the features of the resonant converter 500A, such that the resonant converter 500A operates properly with the switching frequency FS equal to the preset frequency FM. In some embodiments, the preset frequency is the minimum switching frequency.

In various embodiments, there are various control methods to adjusting the first time interval (e.g. time intervals [T21-T22] and [T41-T42]) and the second time interval (e.g. time intervals [T24-T25] and [T44-T45]) to increase the output voltage. Three of the methods are described below with details as examples.

The first control method is described following. At first, the leading time control circuit 557A increases the second time interval by moving an end (e.g. the moments T24 and T44) of the second time interval backward in time until the end of the second time interval reaches a zero current switching point. The zero current switching point is defined by a moment that a current passing through a load is substantially equal to zero. For example, as illustratively shown in FIGS. 2 and 4, the current IL1 and IL3 passing through the loads are substantially equal to zero at the moments T23 and T43, respectively. Therefore, the moments T23 and T43 correspond to zero current switching points.

Then, after the end of the second time interval reaches the zero current switching point, the second time interval is fixed and the delay time control circuit 558A increases the first time interval by moving an end (e.g. the moments T22 and T42) of the first time interval forward in time until the current ILR5 reaches a preset current. After the current ILR5 reaches a preset current, the first time interval is fixed.

The second control method is described following. At first, the delay time control circuit 558A increases the first time interval by moving the end of the first time interval forward in time until the current ILR5 reaches a preset current. After the current ILR5 reaches a preset current, the first time interval is fixed and the second time interval start to increase until the end of the second time interval reaches the zero current switching point.

For the first and second control methods described above, after the second time interval reaches the zero current switching point, the second time interval can be further increased to further increasing the gain of the resonant converter 500A.

The third control method is described following. At first, the leading time control circuit 557A increases the second time interval by moving the end of the second time interval backward in time. Then, the delay time control circuit 558A increases the first time interval by moving the end of the first time interval forward in time. When the current ILR5 reaches a preset current and the end of the second time interval reaches a zero current switching point, the first time interval is fixed and the second time interval is fixed to keep increasing for increasing the gain of the resonant converter 500A.

In some embodiments, the switching frequency FS is fixed, such that the switching frequency FS is substantially equal to a preset frequency FM.

Figure 5B:
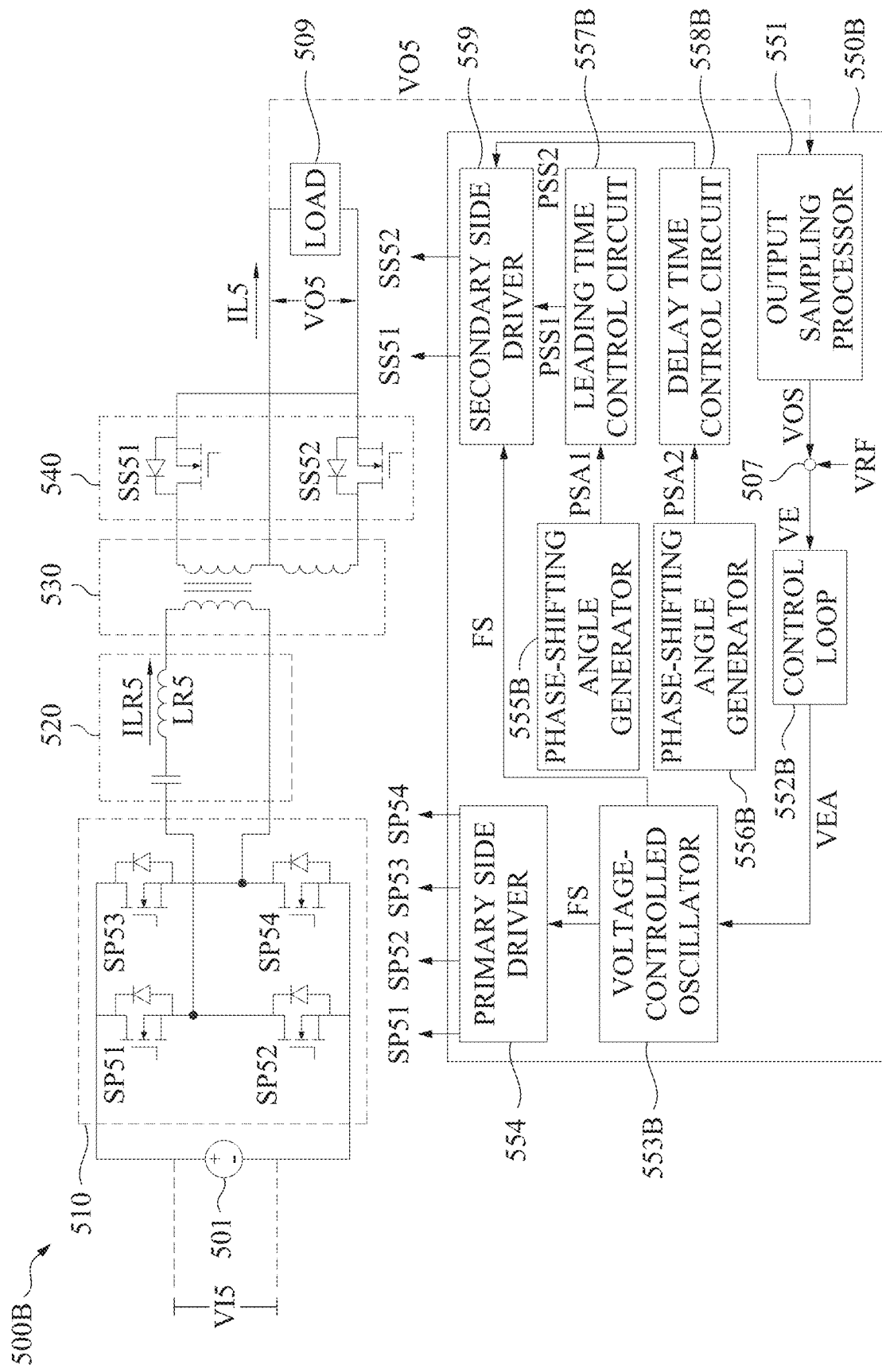
FIG. 5B is a circuit diagram of a resonant converter with a control circuit in accordance with some embodiments of the present disclosure.

FIG. 5B is a circuit diagram of a resonant converter 500B in accordance with some embodiments of the present disclosure. As illustratively shown in FIG. 5B with reference to FIG. 5A, configurations of the resonant converter 500B are similar to those of resonant converter 500A. Therefore, some descriptions are not repeated in embodiments associated with FIG. 5B for brevity.

As illustratively shown in FIG. 5B with reference to FIG. 5A, differences between the resonant converter 500B and 500A focus in the control circuit 550B. The differences between the resonant converter 500B and 500A includes that the control circuit 550B includes a control loop 552B, a voltage-controlled oscillator 553B, phase-shifting angle generators 555B, 556B, a leading time control circuit 557B and a delay time control circuit 558B.

In some embodiments, the control circuit 550B is configured to adjust the first time interval and/or the second time interval according to the output voltage VO5 and phase-shifting angles PSA1, PSA2. The details of the phase-shifting angles PSA1, PSA2 are described below.

In some embodiments, the control loop 552B is configured to receive an error signal VE and provide a control signal VEA to the voltage-controlled oscillator 553B.

In some embodiments, the voltage-controlled oscillator 553B is configured to receive the control signal VEA and provide the switching frequency FS. In some embodiments, the voltage-controlled oscillator 553B is configured to adjust the switching frequency FS according to the control signal VEA. For example, the voltage-controlled oscillator 553B adjusts the switching frequency FS.

In some embodiments, the phase-shifting angle generator 555B is configured to provide a phase-shifting angle PSA1 to the leading time control circuit 557B. In some embodiments, phase-shifting angle PSA1 is a first fixed value.

In some embodiments, the leading time control circuit 557B is configured to receive the phase-shifting angle PSA1 and provide the phase-shifting signal PSS1 to the secondary side driver 559. In various embodiments, the phase-shifting signal PSS1 corresponds to the time length of the time interval [T24-T25] or the time interval [T44-T45]. In some embodiments, the leading time control circuit 557B is configured to generate the phase-shifting signal PSS1 based on the phase-shifting angle PSA1.

In some embodiments, the phase-shifting angle generator 556B is configured to provide a phase-shifting angle PSA2 to the delay time control circuit 558B. In some embodiments, phase-shifting angle PSA2 is a second fixed value. In some embodiments, the first fixed value is the same as the second fixed value. In other embodiments, the first fixed value is different from the second fixed value.

In some embodiments, the delay time control circuit 558B is configured to receive the phase-shifting angle PSA2 and provide the phase-shifting signal PSS2 to the secondary side driver 559. In various embodiments, the phase-shifting signal PSS2 corresponds to the time length of the time interval [T21-T22] or the time interval [T41-T42]. In some embodiments, the leading time control circuit 558B is configured to generate the phase-shifting signal PSS2 based on the phase-shifting angle PSA2.

In some embodiments, the secondary side driver 559 is configured to receive the switching frequency FS and the phase-shifting signals PSS1, PSS2, and drive the switches SS51 and SS52, such that at least one of the secondary switches SS51 and SS52 is turned on during the first time interval and at least one of the secondary switches SS51 and SS52 is turned on during the second time interval.

In some embodiments, when the phase-shifting angles PSA1 and PSA2 are fixed value respectively, the voltage-controlled oscillator 553B is configured to decrease the switching frequency FS to increase the output voltage. The output voltage increasing is referred to as a gain of the resonant converter 500B increasing in some embodiments.

Figure 5C:
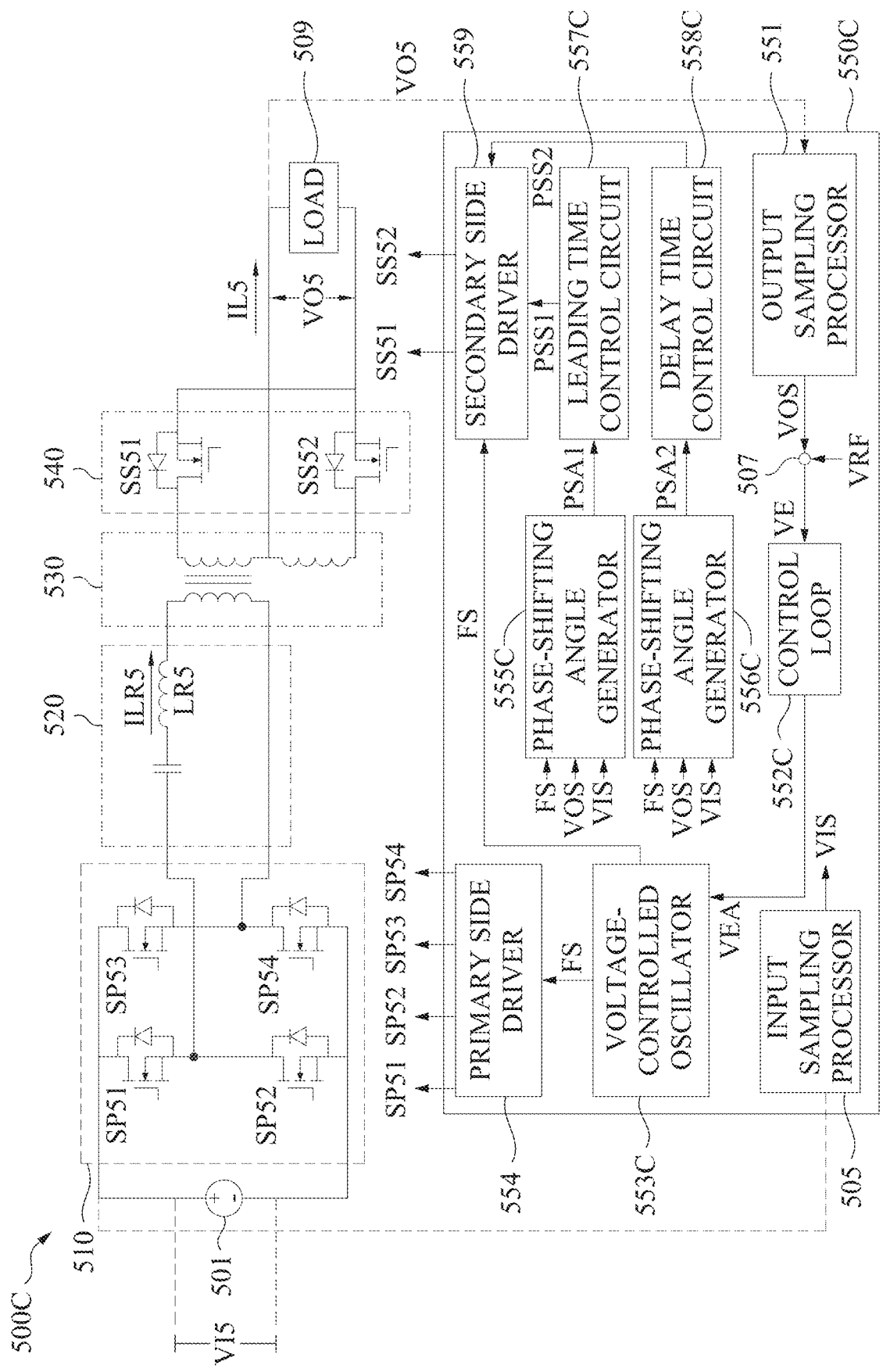
FIG. 5C is a circuit diagram of a resonant converter with a control circuit in accordance with some embodiments of the present disclosure.

FIG. 5C is a circuit diagram of a resonant converter 500C in accordance with some embodiments of the present disclosure. As illustratively shown in FIG. 5C with reference to FIG. 5B, configurations of the resonant converter 500C are similar to those of resonant converter 500B. Therefore, some descriptions are not repeated in embodiments associated with FIG. 5C for brevity.

As illustratively shown in FIG. 5C with reference to FIG. 5B, differences between the resonant converter 500C and 500B focus in the control circuit 550C. The control circuit 550C includes a control loop 552C, a voltage-controlled oscillator 553C, phase-shifting angle generator 555C, 556C, a leading time control circuit 557C, a delay time control circuit 558C and an input sampling processor 505. The operation of the control loop 552C, the voltage-controlled oscillator 553C, the leading time control circuit 557C and the delay time control circuit 558C are similar to that of the control loop 552B, the voltage-controlled oscillator 553B, the leading time control circuit 557B and the delay time control circuit 558B, and thus some descriptions are not repeated for brevity.

In some embodiments, the control circuit 550C is configured to adjust the first time interval and/or the second time interval according to the output voltage VO5 and the input voltage V15.

In some embodiments, the input sampling processor 505 is configured to receive the input voltage V15 and provide a scaled input voltage VIS. In some embodiments, the scaled input voltage VIS corresponds to the input voltage.

In some embodiments, the phase-shifting angle generator 555C is configured to receive the scaled input voltage VIS, the scaled output voltage VOS and the switching frequency FS to provide a phase-shifting angle PSA1.

In some embodiments, the phase-shifting angle generator 556C is configured to receive the scaled input voltage VIS, the scaled output voltage VOS and the switching frequency FS to provide a phase-shifting angle PSA2.

In some approaches, an output voltage of a resonant converter decreases when an input voltage decreases, e.g., an input terminal of the resonant converter is powered down.

Compare to above approaches, in some embodiments of present disclosure, various methods are provided for maintaining the output voltage VO5 by adjusting phase-shifting angles PSA1, PSA2 and the switching frequency FS. Furthermore, the first time interval, the second time interval is adjusted to increase the holdup time of the resonant converter 500C.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A resonant converter, comprising:
   a primary circuit configured to receive an input voltage and comprising:
   a plurality of primary switches configured to operate with a switching frequency, wherein at least one of the primary switches is configured to be turned on from a first switching moment until a second switching moment;
   a transformer having a primary winding and a secondary winding;
   a resonant network coupled between the primary circuit and the primary winding, wherein a current of the resonant network changes a direction at a first moment between the first switching moment and the second switching moment;
   a secondary circuit coupled to the secondary winding and configured to provide an output voltage to a load, and comprising:
   a plurality of secondary switches, wherein at least first one of the secondary switches is configured to be turned on during a first preset time interval which is from the first moment to a second moment to increase the current of the resonant network in a first direction by the secondary winding being clamped by a preset voltage, wherein an output current of the resonant converter is increased in a second direction or equal to zero during the first preset time interval, and at least second one of the secondary switches is configured to be turned on during a second preset time interval which is from a third moment to the second switching moment to increase the current of the resonant network in the first direction by the secondary winding being clamped by the preset voltage, wherein the output current of the resonant converter is increased in the second direction or equal to zero during the second preset time interval, wherein the third moment is between the second moment and the second switching moment; and a control circuit coupled with the primary switches and the secondary switches, configured to control at least one of the primary switches to be turned on from the first switching moment until the second switching moment, and configured to control the at least first one of the secondary switches to be turned on during the first preset time interval and the at least second one of the secondary switches to be turned on during the second preset time interval.

2. The resonant converter of claim 1, wherein the control circuit is configured to adjust the first preset time interval and/or the second preset time interval according to the output voltage, or configured to adjust the first preset time interval and/or the second preset time interval according to the output voltage and an input voltage.

3. The resonant converter of claim 1, wherein the control circuit configured to control the secondary switches to be turned off during a third preset time interval which is from a fourth moment until the third moment, such that the current of the resonant network is equal to zero, wherein the fourth moment is between the second moment and the third moment.

4. The resonant converter of claim 3, wherein the control circuit is configured to adjust a third preset time interval according to the output voltage, or configured to adjust the third preset time interval according to the output voltage and an input voltage.

5. The resonant converter of claim 1, wherein the secondary winding comprises: a first terminal, a second terminal and a center-tapped terminal;

the secondary switches comprises:
  a first switch, a first terminal of the first switch coupled to the first terminal of the secondary winding; and
  a second switch, a first terminal of the second switch coupled to the second terminal of the secondary winding, a second terminal of the second switch coupled to the second terminal of the first switch;

wherein the second terminal of the first switch is coupled to a first output terminal of the resonant converter and the center-tapped terminal is coupled to a second output terminal of the resonant converter, and the control circuit is configured to control the second switch to be turned on during the first preset time interval to increase the current of the resonant network in the first direction and the output current of the resonant converter in the second direction by the secondary winding being clamped by the preset voltage, and configured to control the second switch to be turned on during the second preset time interval to increase the current of the resonant network in the first direction and the output current of the resonant converter in the second direction by the secondary winding being clamped by the preset voltage; or the second terminal of the first switch is coupled to the second output terminal of the resonant converter and the center-tapped terminal is coupled to the first output terminal of the resonant converter, and the control circuit is configured to control the first switch to be turned on during the first preset time interval to increase the current of the resonant network in the first direction and the output current of the resonant converter in the second direction by the secondary winding being clamped by the preset voltage, and configured to control the first switch to be turned on during the second preset time interval to increase the current of the resonant network in the first direction and the output current of the resonant converter in the second direction by the secondary winding being clamped by the preset voltage.

6. The resonant converter of claim 5, wherein the control circuit is configured to control the first switch and the second switch to be turned off during a third preset time interval which is from a fourth moment until the third moment, such that the current of the resonant converter is equal to zero, wherein the fourth moment is between the second moment and the third moment.

7. The resonant converter of claim 1, wherein the secondary switches comprises:

a first switch, a first terminal of the first switch coupled to a first terminal of the secondary winding, and a second terminal of the first switch coupled to a first output terminal of the resonant converter;

a second switch, a first terminal of the second switch coupled to the first terminal of the secondary winding, and a second terminal of the second switch coupled to a second output terminal of the resonant converter;

a third switch, a first terminal of the third switch coupled to the second terminal of the first switch, and a second terminal of the third switch coupled to a second terminal of the secondary winding; and a fourth switch, a first terminal of the fourth switch coupled to the second terminal of the third switch, a second terminal of the fourth switch coupled to the second terminal of the second switch.

8. The resonant converter of claim 7, wherein the first switch and the fourth switch forms a first switch group, and the second switch and the third switch forms a second switch group; and the control circuit is configured to control the second switch group to be turned on during the first preset time interval or the second preset time interval by the secondary winding being clamped by the preset voltage to increase the current of the resonant network in the first direction and the output current of the resonant converter in the second direction.

9. The resonant converter of claim 7, wherein the first switch and the third switch forms a third switch group, and the second switch and the fourth switch forms a fourth switch group; and the control circuit is configured to control one of the third switch group and the fourth switch group to be turned on during the first preset time interval or the second preset time interval by the secondary winding being clamped by the preset voltage to increase the current of the resonant network in the first direction, wherein the preset voltage is equal to zero and the output current of the resonant converter is equal to zero during the first preset time interval or the second preset time interval.

10. The resonant converter of claim 7, wherein the control circuit is configured to control at least three of the first switch, the second switch, the third switch and the fourth switch to be turned off during a third preset time interval which is from a fourth moment until the third moment, such that the current of the resonant converter is equal to zero, wherein the fourth moment is between the second moment and the third moment.

11. The resonant converter of claim 1, wherein the control circuit comprises:
a voltage-controlled oscillator configured to provide the switching frequency;
a primary side driver configured to drive the primary switches according to the switching frequency;
an output sampling processor configured to receive the output voltage and provide a scaled output voltage;
a comparator configured to compare the scaled output voltage with a reference voltage, and configured to generate an error signal corresponding to a difference between the scaled output voltage and the reference voltage;
a control loop configured to receive the error signal and provide an control signal;
a leading time control circuit configured to receive the control signal and provide a first phase-shifting signal;
a delay time control circuit configured to receive the control signal and provide a second phase-shifting signal; and
a secondary side driver configured to drive the at least first one of the secondary switches to be turned on during the first preset time interval and the at least second one of the secondary switches to be turned on during the second preset time interval according to the switching frequency, the first phase-shifting signal and the second phase-shifting signal.

12. The resonant converter of claim 11, wherein the switching frequency is substantially equal to a preset frequency.

13. The resonant converter of claim 11, wherein the control circuit is configured to adjust the first preset time interval and/or the second preset time interval according to the output voltage and the switching frequency.

14. The resonant converter of claim 1, wherein the control circuit comprises:
an output sampling processor configured to receive the output voltage and provide a scaled output voltage;
a comparator configured to receive the scaled output voltage and a reference voltage and provide an error signal;
a control loop configured to receive the error signal and provide a control signal;
a voltage-controlled oscillator configured to receive the control signal and provide the switching frequency;
a primary side driver configured to drive the plurality of primary switches according to the switching frequency;
a first phase-shifting angle generator configured to provide a first phase-shifting angle;
a second phase-shifting angle generator configured to provide a second phase-shifting angle;
a leading time control circuit configured to receive the first phase-shifting angle and provide a first phase-shifting signal;
a delay time control circuit configured to receive the second phase-shifting angle and provide a second phase-shifting signal; and
a secondary side driver configured to drive the at least first one of the secondary switches to be turned on during the first preset time interval and the at least second one of the secondary switches to be turned on during the second preset time interval according to the switching frequency, the first phase-shifting signal and the second phase-shifting signal.

15. The resonant converter of claim 14, wherein at least one of the first phase-shifting angle is a first fixed value, and the second phase-shifting angle is a second fixed value.

16. The resonant converter of claim 14, wherein the control circuit is configured to adjust the first preset time interval and/or the second preset time interval according to the output voltage, the first phase-shifting angle and the second phase-shifting angle.

17. The resonant converter of claim 1, wherein the control circuit comprises:
an input sampling processor configured to receive the input voltage and provide a scaled input voltage;
an output sampling processor configured to receive the output voltage and provide a scaled output voltage;
a comparator configured to receive the scaled output voltage and a reference voltage and provide an error signal;
a control loop configured to receive the error signal and provide a control signal;
a voltage-controlled oscillator configured to receive the control signal and provide the switching frequency;
a primary side driver configured to drive the plurality of primary switches according to the switching frequency;
a first phase-shifting angle generator configured to receive the scaled input voltage, the scaled output voltage and the switching frequency to provide a first phase-shifting angle;
a second phase-shifting angle generator configured to receive the scaled input voltage, the scaled output voltage and the switching frequency provide a second phase-shifting angle;
a leading time control circuit configured to receive the first phase-shifting angle and provide a first phase-shifting signal;
a delay time control circuit configured to receive the second phase-shifting angle and provide a second phase-shifting signal; and
a secondary side driver configured to drive the at least first one of the secondary switches to be turned on during the first preset time interval and the at least second one of the secondary switches to be turned on during the second preset time interval according to the switching frequency, the first phase-shifting signal and the second phase-shifting signal.

18. The resonant converter of claim 17, wherein the control circuit is configured to adjust the first preset time interval and/or the second preset time interval according to the output voltage and the input voltage.

19. A method of controlling a resonant converter, the resonant converter includes a primary circuit, a resonant network coupled to the primary circuit, a transformer having a primary winding coupled to the resonant network and a secondary winding, and a secondary circuit coupled to the secondary winding and a control circuit coupled the primary circuit and the secondary circuit, wherein the primary circuit includes primary switches, and the secondary winding includes secondary switches, the method comprising:
controlling, with a switching frequency, the primary switches of the primary circuit configured to receive an input voltage;
wherein controlling the primary switches comprises:
turning on at least one of the primary switches from a first switching moment until a second switching moment;

transforming the input voltage by the transformer and the resonant network; and controlling the secondary switches of the secondary circuit to provide an output voltage to a load, wherein controlling the secondary switches comprises:

turning on at least first one of the secondary switches during a first preset time interval which is from a first moment to a second moment to increase a current of the resonant network in a first direction by the secondary winding being clamped by a preset voltage, wherein an output current of the resonant converter is increased in a second direction or equal to zero during the first preset time interval, wherein the first moment and the second moment are between the first switching moment and the second switching moment, and the current of the resonant network changes a direction at the first moment; and turning on at least second one of the secondary switches during a second preset time interval which is from a third moment to the second switching moment to increase the current of the resonant network in the first direction by the secondary winding being clamped by the preset voltage, wherein the output current of the resonant converter is increased in the second direction or equal to zero during the second preset time interval, wherein the third moment is between the second moment and the second switching moment.

20. The method of claim 19, further comprising:
adjusting the first preset time interval and/or the second preset time interval according to the output voltage; or
adjusting the first preset time interval and/or the second preset time interval according to the output voltage and the input voltage.

21. The method of claim 19, further comprising:
controlling the secondary switches to be turned off during a third preset time interval which is from a fourth moment until the third moment, such that the output current of the resonant converter is equal to zero, wherein the fourth moment is between the second moment and the third moment.

22. The method of claim 21, further comprising:
adjusting the third preset time interval according to the output voltage; or
adjusting the third preset time interval according to the output voltage and the input voltage.

23. The method of claim 19, wherein controlling the secondary switches comprises:
turning on a second switch during the first preset time interval;
turning off a first switch and the second switch during a third preset time interval which is from a fourth moment until the third moment; and
turning on the second switch during the second preset time interval,
wherein
a first terminal of the first switch is coupled to a first terminal of the secondary winding, and a second terminal of the first switch is coupled to a second terminal of the second switch,
the second terminal of the second switch is coupled to a first output terminal of the resonant converter, and a first terminal of the second switch is coupled to a second terminal of the secondary winding, and
a second output terminal of the resonant converter is coupled to a center-tapped terminal, wherein two coils of the secondary winding coupled in series with each other at the center-tapped terminal.

24. The method of claim 19, wherein controlling the secondary switches comprises:
turning on a second switch group formed by a second switch and a third switch during the first preset time interval or the second preset time interval; and
turning off at least three of a first switch, the second switch, a third switch and a fourth switch during a third preset time interval which is from a fourth moment until the third moment, wherein the fourth moment is between the second moment and the third moment;
wherein
a first terminal of the first switch is coupled to a first terminal of the second switch, a second terminal of the first switch is coupled to a first terminal of the third switch,
the first terminal of the second switch is coupled to a first terminal of the secondary winding, a second terminal of the second switch is coupled to a second output terminal of the resonant converter,
the first terminal of the third switch is coupled to a first output terminal of the resonant converter, a second terminal of the third switch is coupled to a second terminal of the secondary winding, and
the first terminal of the fourth switch is coupled to the second terminal of the secondary winding, a second terminal of the fourth switch is coupled to the second terminal of the second switch.

25. The method of claim 19, wherein controlling the secondary switches comprises:
turning on one of a third switch group formed by a first switch and a third switch and a fourth switch group formed by a second switch and a fourth switch during the first preset time interval or the second preset time interval; and
turning off at least three of the first switch, the second switch, the third switch and a fourth switch during a third preset time interval which is from a fourth moment until the third moment, wherein the fourth moment is between the second moment and the third moment;
wherein
a first terminal of the first switch is coupled to a first terminal of the second switch, a second terminal of the first switch is coupled to a first terminal of the third switch,
the first terminal of the second switch is coupled to a first terminal of the secondary winding, a second terminal of the second switch is coupled to a second output terminal of the resonant converter,
the first terminal of the third switch is coupled to a first output terminal of the resonant converter, a second terminal of the third switch is coupled to a second terminal of the secondary winding, and
the first terminal of the fourth switch is coupled to the second terminal of the secondary winding, a second terminal of the fourth switch is coupled to the second terminal of the second switch.

26. The method of claim 19, wherein
controlling the primary switches further comprises:
providing the switching frequency; and
driving the primary switches according to the switching frequency; and
controlling the secondary switches further comprises:
receiving the output voltage and providing a scaled output voltage;

comparing the scaled output voltage and a reference voltage;
generating an error signal based on a difference between the scaled output voltage and the reference voltage;
receiving the error signal and providing a control signal;
providing a first phase-shifting signal according the control signal;
providing a second phase-shifting signal according the control signal; and
driving the at least first one of the secondary switches to be turned on during the first preset time interval and the at least second one of the secondary switches to be turned on during the second preset time interval according to the switching frequency, the first phase-shifting signal and the second phase-shifting signal.

27. The method of claim 19, wherein
controlling the primary switches further comprises:
receiving the output voltage and providing a scaled output voltage;
comparing the scaled output voltage with a reference voltage;
generating an error signal based on a difference between the scaled output voltage and the reference voltage;
providing a control signal according the error signal;
generating the switching frequency according to the control signal; and
driving the primary switches according to the switching frequency; and
controlling the secondary switches further comprises:
providing a first phase-shifting signal according to a first phase-shifting angle;
providing a second phase-shifting signal according to a second phase-shifting angle; and
driving the at least first one of the secondary switches to be turned on during the first preset time interval and the at least second one of the secondary switches to be turned on during the second preset time interval according to the switching frequency, first phase-shifting signal and the second phase-shifting signal.

28. The method of claim 19, wherein
controlling the primary switches further comprises:
receiving the output voltage and providing a scaled output voltage;
comparing the scaled output voltage with a reference voltage;
generating an error signal based on a difference between the scaled output voltage and the reference voltage;
providing a control signal according the error signal;
generating the switching frequency according to the control signal; and
driving the primary switches according to the switching frequency; and
controlling the secondary switches further comprises:
providing a scaled input voltage according to the input voltage;
providing a first phase-shifting angle according to the switching frequency, the scaled input voltage and the scaled output voltage;
providing a first phase-shifting signal according to the first phase-shifting angle;
providing a second phase-shifting angle according to the switching frequency, the scaled input voltage and the scaled output voltage;
providing a second phase-shifting signal according to the second phase-shifting angle; and
driving the at least first one of the secondary switches to be turned on during the first preset time interval and the at least second one of the secondary switches to be turned on during the second preset time interval according to the switching frequency, the first phase-shifting signal and the second phase-shifting signal.

\* \* \* \* \*